(12) United States Patent
Bryne

(10) Patent No.: US 9,511,817 B2
(45) Date of Patent: Dec. 6, 2016

(54) PEDAL AND CLEAT ASSEMBLY

(71) Applicant: Speedplay, Inc., San Diego, CA (US)

(72) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 18 days.

(21) Appl. No.: 14/028,345

(22) Filed: Sep. 16, 2013

(65) Prior Publication Data

US 2014/0260786 A1 Sep. 18, 2014

Related U.S. Application Data

(63) Continuation-in-part of application No. 13/828,782, filed on Mar. 14, 2013.

(51) Int. Cl.
*B62M 3/00* (2006.01)
*B62M 3/08* (2006.01)

(52) U.S. Cl.
CPC ............. *B62M 3/086* (2013.01); *Y10T 74/217* (2015.01)

(58) Field of Classification Search
CPC ..................................................... B62M 3/086
USPC ..................... 74/594.1, 594.6; 36/131, 134
See application file for complete search history.

(56) References Cited

U.S. PATENT DOCUMENTS

| | | |
|---|---|---|
| 1,370,730 A | 3/1921 | Carver |
| 3,808,910 A | 5/1974 | Desbois |
| 3,859,867 A | 1/1975 | Haines et al. |
| 4,055,005 A | 10/1977 | Meinhart |
| 4,298,210 A * | 11/1981 | Lotteau et al. ............... 280/259 |
| 4,488,453 A | 12/1984 | Drugeon et al. |
| 4,599,914 A | 7/1986 | Dunn et al. |
| 4,599,915 A | 7/1986 | Hlavac et al. |
| 4,735,107 A | 4/1988 | Winkie |
| 4,739,564 A | 4/1988 | Eser |
| 4,803,894 A | 2/1989 | Howell |
| 4,815,333 A | 3/1989 | Sampson |

(Continued)

FOREIGN PATENT DOCUMENTS

DE 2816189 A1 8/1979
DE 3315282 A1 10/1984

(Continued)

OTHER PUBLICATIONS bont.com, Bont Crono, www.bont.com/cycling/pages/bontcrono.html.

(Continued)

*Primary Examiner* — Vicky Johnson
(74) *Attorney, Agent, or Firm* — Sheppard, Mullin, Richter & Hampton LLP

(57) ABSTRACT

A pedal and cleat assembly comprises a pedal body having a first end and a second end, a first retainer mounted proximate the first end of the pedal body, and a second retainer mounted proximate the second end of the pedal body. The cleat assembly is configured to be releaseably coupled to the pedal assembly and comprises a cleat body having at least one coupling area, and at least one element shaped to be maintained within or disposed on the coupling area. The at least one coupling area is positioned at a forward or rearward end of the cleat body so that the at least one element can act as a cam surface against the first or second retainer. The at least one element is configured to rotate or articulate when maintained within or disposed on the coupling area to facilitate releasing the cleat assembly from the pedal assembly.

24 Claims, 23 Drawing Sheets

(56) References Cited

U.S. PATENT DOCUMENTS

| | | | |
|---|---|---|---|
| 4,819,504 A | 4/1989 | Sampson | |
| 4,827,633 A | 5/1989 | Feldstein | |
| 4,827,797 A | 5/1989 | Le Faou et al. | |
| 4,840,086 A | 6/1989 | Bidal | |
| 4,898,063 A | 2/1990 | Sampson | |
| 4,899,618 A | 2/1990 | Christol | |
| 4,936,164 A | 6/1990 | Forke | |
| 4,942,778 A | 7/1990 | Bryne | |
| 5,007,185 A | 4/1991 | Lazarski | |
| 5,031,342 A | 7/1991 | Crook | |
| 5,079,968 A | 1/1992 | Starner | |
| 5,199,324 A | 4/1993 | Sain | |
| 5,213,009 A | 5/1993 | Bryne | |
| 5,284,066 A | 2/1994 | Weiss | |
| 5,321,995 A | 6/1994 | Zedan | |
| 5,325,738 A | 7/1994 | Bryne | |
| 5,363,573 A | 11/1994 | Kilgore et al. | |
| 5,371,903 A | 12/1994 | Lew | |
| 5,406,647 A | 4/1995 | Lew | |
| 5,546,829 A * | 8/1996 | Bryne | 74/594.6 |
| 5,553,516 A | 9/1996 | Weiss | |
| 5,557,985 A | 9/1996 | Nagano | |
| 5,575,184 A | 11/1996 | De Schrijver | |
| 5,606,894 A | 3/1997 | Bryne | |
| 5,657,558 A | 8/1997 | Pohu | |
| 5,687,619 A | 11/1997 | Bryne | |
| 5,697,262 A | 12/1997 | Chen | |
| 5,727,429 A | 3/1998 | Ueda | |
| 5,765,450 A | 6/1998 | Kruger et al. | |
| 5,778,739 A | 7/1998 | Takahama | |
| 5,784,931 A | 7/1998 | Ueda | |
| 5,806,379 A | 9/1998 | Nagano | |
| 5,852,955 A * | 12/1998 | Crisick et al. | 74/594.6 |
| 5,860,330 A | 1/1999 | Code et al. | |
| 5,862,716 A | 1/1999 | Bryne | |
| 5,916,332 A | 6/1999 | Chen | |
| D413,711 S | 9/1999 | Hicks, Jr. | |
| 6,003,408 A | 12/1999 | Hervig | |
| 6,014,914 A | 1/2000 | Ueda | |
| 6,070,493 A | 6/2000 | Chen | |
| 6,128,973 A | 10/2000 | Nagano | |
| 6,151,989 A | 11/2000 | Ueda | |
| 6,205,885 B1 | 3/2001 | Hermansen et al. | |
| 6,244,136 B1 | 6/2001 | Chen | |
| 6,309,010 B1 | 10/2001 | Whitten | |
| 6,425,304 B1 | 7/2002 | Bryne | |
| 6,446,529 B1 | 9/2002 | Tanaka | |
| 6,453,771 B1 | 9/2002 | Takahama et al. | |
| 6,490,948 B2 | 12/2002 | Tanaka | |
| 6,494,117 B1 * | 12/2002 | Bryne | 74/594.6 |
| 6,581,493 B1 | 6/2003 | Gillane | |
| D481,974 S | 11/2003 | Evans | |
| 7,013,754 B2 | 3/2006 | Milanowski | |
| 7,017,445 B2 | 3/2006 | Bryne | |
| 7,174,807 B2 | 2/2007 | Bryne | |
| 7,322,259 B2 | 1/2008 | De Bast et al. | |
| 7,383,646 B2 | 6/2008 | Hall | |
| 7,472,498 B2 | 1/2009 | Bryne | |
| D595,620 S | 7/2009 | Kingsbury | |
| 7,779,560 B2 | 8/2010 | Kay | |
| 7,856,905 B2 | 12/2010 | Hsieh | |
| 7,877,904 B2 | 2/2011 | Bryne | |
| 8,272,150 B2 | 9/2012 | Bryne | |
| 8,387,287 B2 | 3/2013 | Kay et al. | |
| D683,665 S | 6/2013 | Smith | |
| 8,857,292 B2 * | 10/2014 | Bryne | 74/594.6 |
| 2001/0008093 A1 | 7/2001 | Heim | |
| 2002/0144569 A1 | 10/2002 | Tanaka | |
| 2003/0051576 A1 | 3/2003 | Muraoka | |
| 2004/0187635 A1 | 9/2004 | Bryne | |
| 2004/0237705 A1 | 12/2004 | Conarro et al. | |
| 2005/0155452 A1 * | 7/2005 | Frey | 74/594.6 |
| 2005/0252337 A1 | 11/2005 | Chen | |
| 2005/0284253 A1 | 12/2005 | Hervig | |
| 2006/0070489 A1 | 4/2006 | Chen | |
| 2006/0236809 A1 | 10/2006 | Bryne | |
| 2007/0084086 A1 | 4/2007 | Bryne | |
| 2007/0193402 A1 | 8/2007 | Hsieh | |
| 2010/0107451 A1 | 5/2010 | Kay et al. | |
| 2010/0301632 A1 | 12/2010 | Bryne | |
| 2011/0283568 A1 | 11/2011 | Woodford | |
| 2012/0103131 A1 | 5/2012 | Bryne | |
| 2012/0233891 A1 | 9/2012 | Woodford | |

FOREIGN PATENT DOCUMENTS

| | | |
|---|---|---|
| DE | 3426103 A1 | 1/1986 |
| DE | 3149345 C2 | 1/1989 |
| DE | 202005019542 U1 | 2/2006 |
| EP | 0012097 A2 | 6/1980 |
| EP | 0015803 A2 | 9/1980 |
| EP | 0106162 A1 | 4/1984 |
| EP | 0153210 A1 | 8/1985 |
| EP | 0155114 A2 | 9/1985 |
| EP | 0293340 A2 | 11/1988 |
| EP | 0359134 A2 | 3/1990 |
| EP | 0485956 A1 | 5/1992 |
| EP | 0516013 A2 | 12/1992 |
| EP | 0619219 A1 | 10/1994 |
| EP | 0826587 A1 | 3/1998 |
| EP | 0894446 A1 | 2/1999 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2899869 A1 | 10/2007 |
| FR | 2932450 A1 | 12/2009 |
| GB | 2285609 A | 7/1995 |
| JP | 64-23202 | 7/1989 |
| JP | 05111402 | 5/1993 |
| JP | H11-103902 | 4/1999 |
| JP | 2005-46629 | 2/2005 |
| TW | 368973 | 9/1999 |
| TW | 392662 | 6/2000 |
| TW | 200303278 | 9/2003 |
| TW | M293881 | 7/2006 |
| TW | I308543 | 4/2009 |
| WO | WO2004089741 | 10/2004 |

OTHER PUBLICATIONS pearlizumi.com, PI Aero Lycra Shoe Cover, www.pearlizumi.com/product.pjp? mode=view&pc_id=50&product_id=193110.
Frog Pedal Specifications, www.speedplay.com.
Speedplay brochure.
International Search Report for International Application No. PCT/US2010/056057.
International Preliminary Report on Patentability for International Application No. PCT/US2010/056057.
European Search Report for Application No. 13190753.7-753.
Office Action for Japanese Patent Application No. 2011-540875.

* cited by examiner

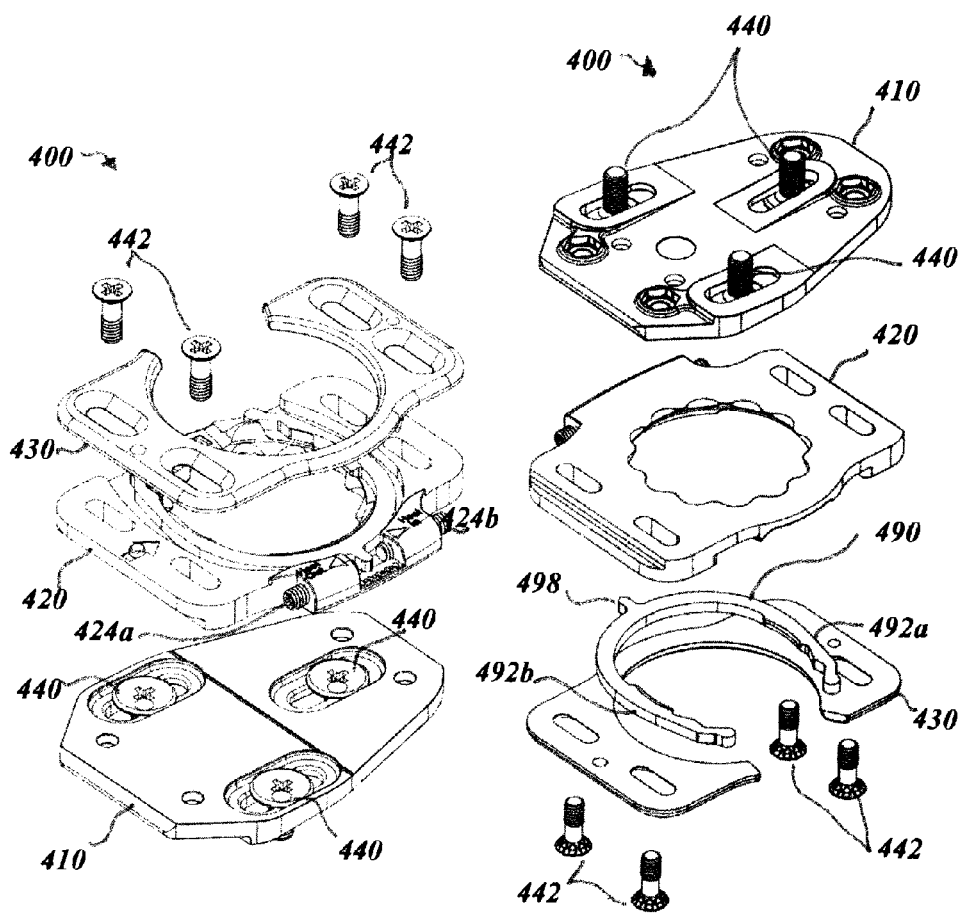
*Figure 9A*  *Figure 9B*

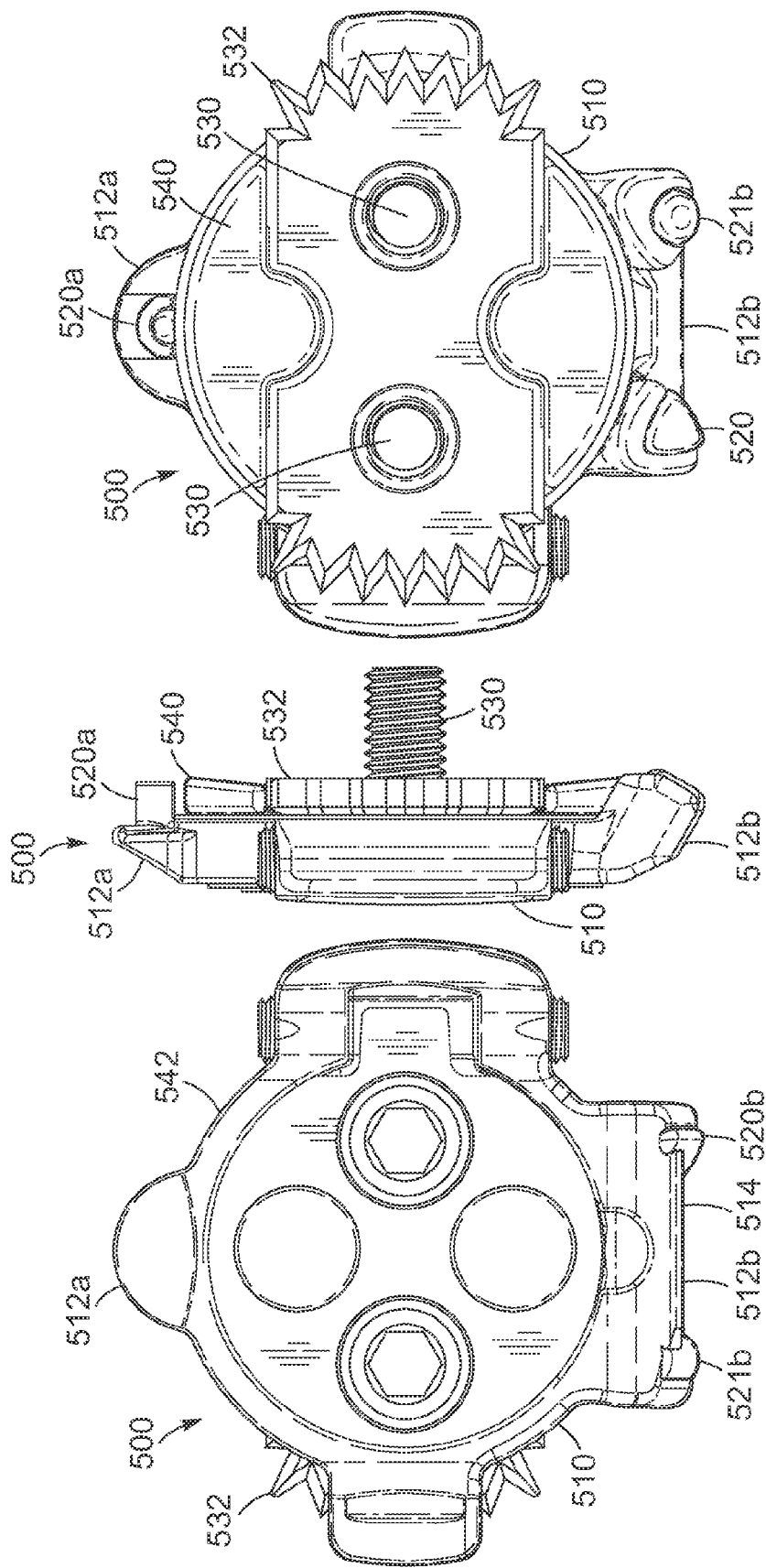

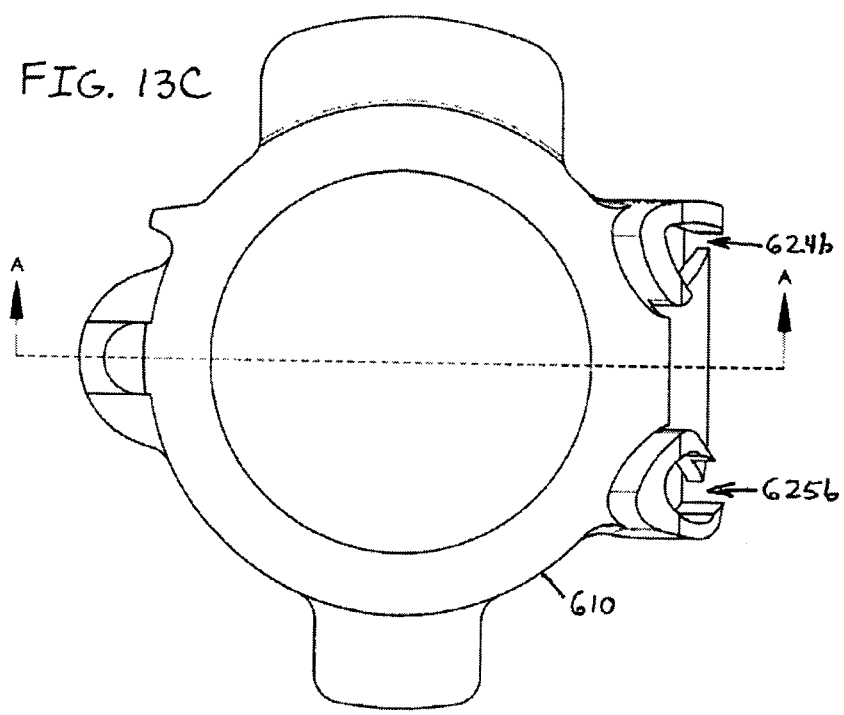
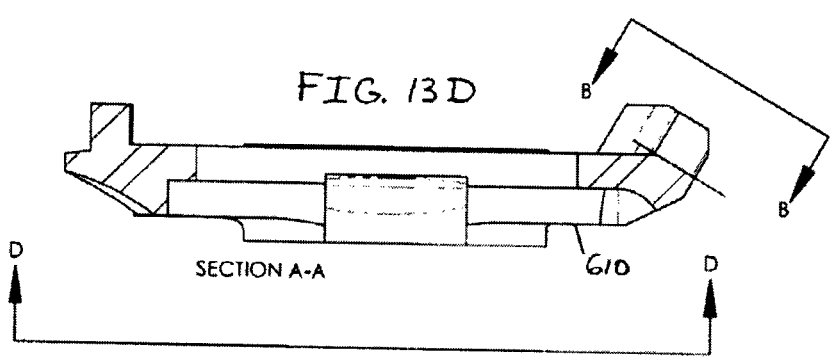

VIEW B-B

SECTION C-C

VIEW D-D

PEDAL AND CLEAT ASSEMBLY

CROSS REFERENCE TO RELATED APPLICATION

This is a continuation-in-part of U.S. application Ser. No. 13/828,782, filed on Mar. 14, 2013, the entire contents of which are herein incorporated by reference.

FIELD OF THE INVENTION

This invention relates generally to an improved pedal and cleat assembly and, more particularly, to pedal and cleat assemblies incorporating features which permit the ready engagement and release of the pedal and cleat under a variety of environmental conditions.

BACKGROUND

Clipless pedals (also known as "clip-in" or "step-in" pedals) require a cleat fitted to the sole of a rider's shoe, which locks to the pedal and thus holds the shoe firmly to the pedal. Clipless pedals take a variety of forms and are typically adapted for the demands of a particular type of cycling, such as road cycling and off-road or mountain biking.

Among the myriad of features desired for clipless pedals, the ability to readily engage the cleat to the pedal and to subsequently release the cleat from the pedal is important both for cycling efficiency and safety. The ability to readily release the cleat from the pedal is perhaps a more important factor in ensuring the safety of the rider, as it permits the rider to put one or both feet on the ground to maneuver the bike or to avoid a fall. The normal environmental conditions to which bicycles, and particularly off-road or mountain bikes, are subjected often compromise the ability to release the cleats from the pedal on demand.

What is therefore needed is an improved cleat and pedal assembly that permits the ready engagement and release of the pedal and cleat under a variety of environmental conditions.

BRIEF SUMMARY

Various embodiments of a cleat and pedal assembly are described herein which provide for reliable and ready engagement and release of the cleat and pedal assemblies. Clipless pedals, and particularly clipless pedals made for off-road use, are often designed with relatively small cleat parts that are mounted within a small recessed cavity, typically built into the shoe's sole. Because the cleats are relatively small, the contacting surfaces of the cleat and pedal assemblies are under high stress, high load and high friction during use and during the engagement and release. Given the high demands and forces applied to these relatively small parts, it is important that the contacting areas between the cleat and the pedals be made of materials that are resistant to wear and tear and also resistant to seizing. Thus, clipless pedals for off-road use are desirably made of a material that is not only sufficiently strong to withstand the mechanical stresses, but that also permits the reliable engagement and release functions under a variety of environmental conditions (e.g., wet, dirty, etc.). Metals, such has hardened steel, brass and, to a lesser degree, aluminum and plastic, have been employed in the contacting surfaces of the cleat and pedal assemblies with varying levels of success.

Metals, particularly hardened steel, has proven to be the preferred material for use in these contacting surfaces. The inventor has recognized, however, that metallic contact surfaces of cleat and pedal assemblies may "seize" or "cold-weld" to create an undesired adhesion between the metal contact surfaces and thus prevent the required relative sliding of the two surfaces to allow the cleat to release from the pedal. In other words, the coefficient of friction between the contacting surfaces (especially when subjected to water and dirt) increases to the point where there is "adhesive friction" between the contacting surfaces of the cleat and the pedal. This, in turn, interferes with the rider's ability to disengage from the pedals, thereby creating a dangerous situation for the rider.

One solution, as recognized by the inventor, is to employ materials of different hardness for the contacting surfaces of the cleat and pedal assembly involved in the engagement and release of the cleat to the pedal. In a preferred embodiment, at least one, if not both, of the contacting surfaces is made of a material, preferably a non-metallic material or a ceramic, having a measure of hardness that is greater than hardened steel. Carbides are a particularly preferred choice of material. Carbides are not only extremely durable and resistant to wear and corrosion, they maintain a low coefficient of friction under a variety of conditions and will not seize or cold weld with other metallic or carbide surfaces.

In one preferred embodiment, a pedal and cleat assembly is described. One of the pedal or cleat assembly comprises first and second retainers configured to be biased to an engagement position for coupling the other one of the pedal or cleat assembly. The other one of the pedal or cleat assembly comprises first and second portions configured to be releasably secured by the first and second retainers in the engagement position. The second portion has first and second urging surfaces. Either one or both of the first and second retainers are urged to a yielding position to permit the first and second portion to be secured by the first and second retainers upon application of a first force or contact by one upon the other of the first urging surface and an outer surface of the second retainer. Either one or both of the first and second retainer are configured to be urged to the yielding position to permit the secured second portion to be released from the second retainer upon application of a second force or contact by one upon the other of the second urging surface and a lateral surface of the second retainer. At least one of the second urging surface and the lateral surface of the second retainer is made of a material having a measure of hardness that is greater than hardened steel.

In accordance with a first aspect, the material comprises carbide, and preferably selected from the group consisting of: silicon carbide, boron carbide, tungsten carbide, and titanium carbide.

In accordance with a second aspect, one of the second urging surface and the lateral surface of the second retainer is made of a material comprising carbide and the other one of the second urging surface and the lateral surface is made of a material comprising a metal. Preferably, the metal is hardened steel.

In accordance with a third aspect, both the second urging surface and the lateral surface of the second retainer are made of a carbide.

In accordance with a fourth aspect, the lateral surface is radiused, beveled or curved and the second urging surface has a surface that is complementary to the lateral surface.

In accordance with a fifth aspect, the first and second retainers are provided on the pedal assembly and the first and second portions are provided on the cleat assembly.

In accordance with a sixth aspect, the first and second retainers are biased to an engagement position.

In a second preferred embodiment, another type of pedal and cleat assembly is described. One of the pedal or cleat assembly comprises a retainer portion configured to be biased to an engagement position to releasably secure an engagement portion disposed on the other one of the pedal or cleat assembly. The engagement portion comprises first and second urging surfaces. The retainer portion is configured to be urged to a yielding position to permit the engagement portion to be secured by the retainer portion upon application of a first force or contact by one upon the other of the first urging surface and an outer surface of the retainer portion. The retainer portion is configured to be urged to the yielding position to permit release of the engagement portion from the retainer portion upon application of second force or contact by one upon the other of the second urging surface and a lateral surface of the retainer portion. At least one of the second urging surface and the lateral surface of the retainer portion is made of a material having a measure of hardness that is greater than hardened steel.

In accordance with a first aspect, the material comprises carbide, and preferably selected from the group consisting of: silicon carbide, boron carbide, tungsten carbide, and titanium carbide.

In accordance with a second aspect, one of the second urging surface and the lateral surface of the retainer portion is made of a material comprising carbide and the other one of the second urging surface and the lateral surface of the retainer portion is made of a material comprising a metal. Preferably, the metal is hardened steel.

In accordance with a third aspect, both the second urging surface and the lateral surface of the retainer portion are made of a carbide.

In accordance with a fourth aspect, the retainer portion is resiliently biased to the engagement position.

In a third preferred embodiment, yet another type of pedal and cleat assembly is described. One of the pedal or cleat assembly comprises a retainer for removably coupling the other one of the pedal or cleat assembly, the retainer comprising a first surface. The other one of the pedal or cleat assembly comprises an engagement portion configured to be removably coupled to the retainer, the engagement portion having a second surface. The first and second surfaces are in contact with one another when the pedal and cleat assembly are coupled to one another. At least one of the first and second surfaces is made from a material having a measure of hardness that is greater than hardened steel.

In accordance with a first aspect, the material comprises carbide, and preferably one selected from the group consisting of: silicon carbide, boron carbide, tungsten carbide, and titanium carbide.

In accordance with a second aspect, one of the first and second surfaces is made of a material comprising carbide and the other one of the first and second surfaces is made of a material comprising a metal. Preferably, the metal is hardened steel.

In accordance with a third aspect, both the first and second surfaces are made of a carbide.

In accordance with a fourth aspect, the retainer is a spring movably coupled to the cleat assembly, and the engagement portion comprises a cam insert disposed within the pedal assembly, the spring being made of a resilient metal and the cam insert being made of a carbide.

In a fourth preferred embodiment, a cleat assembly is described. The cleat assembly comprises a cleat body having at least one coupling area and at least one element configured to be maintained within or disposed on the at least one coupling area. The at least one coupling area is positioned at a forward or rearward end of the cleat body so that the at least one element can act as a cam surface against a portion of a bicycle pedal. The at least one element is configured to rotate or articulate when maintained within or disposed on the at least one coupling area to facilitate releasing the cleat assembly from the bicycle pedal.

In accordance with a first aspect, the at last one coupling area is at least one recess formed thereon and wherein the at least one element is shaped to be received in the at least one recess.

In accordance with a second aspect, the at least one recess comprises at least two recesses and the at least one element comprises at least two elements.

In accordance with a third aspect, the at least one element has a generally cylindrical shape.

In accordance with a fourth aspect, the generally cylindrical shape has a rounded top edge.

In accordance with a fifth aspect, rotation or articulation of the at least one element reduces friction between the cleat assembly and the bicycle pedal as the cleat assembly is released from the bicycle pedal.

In accordance with a sixth aspect, rotation or articulation of the at least one element facilitates pivoting the cleat body with respect to the bicycle pedal as the cleat assembly is released from the bicycle pedal.

In accordance with a seventh aspect, the at least one element is made of a material having a measure of hardness that is greater than hardened steel.

In accordance with a eighth aspect, the material comprises carbide.

In accordance with an ninth aspect, the carbide is selected from the group consisting of silicon carbide, boron carbide, tungsten carbide, and titanium carbide.

In a fifth preferred embodiment, yet another type of pedal and cleat assembly is described. The pedal assembly comprises a pedal body having a first end and a second end, a first retainer mounted proximate the first end of the pedal body, and a second retainer mounted proximate the second end of the pedal body. The cleat assembly is configured to be releaseably coupled to the pedal assembly. The cleat assembly comprises a cleat body having at least one coupling area and at least one element shaped to be maintained within or disposed on the at least one coupling area. The at least one coupling area is positioned at a forward or rearward end of the cleat body so that the at least one element can act as a cam surface against the first or second retainer. The at least one element is configured to rotate or articulate when maintained within or disposed on the at least one recess to facilitate releasing the cleat assembly from the pedal assembly.

In accordance with a first aspect, the at least one coupling area is at least one recess formed in the cleat body.

In accordance with a second aspect, the at least one recess comprises at least two recesses, and the at least one element comprises at least two elements.

In accordance with a third aspect, the at least one element has a generally cylindrical shape. The generally cylindrical shape has a rounded top edge. Articulation or rotation of the at least one element reduces friction between the cleat assembly and the pedal assembly as the cleat assembly is released from the pedal assembly. This facilitates pivoting the cleat body with respect to the pedal body as the cleat assembly is released from the pedal assembly.

In accordance with a fourth aspect, the at least one element is made of a material having a measure of hardness that is greater than hardened steel.

In accordance with a fifth aspect, the material comprises carbide. The carbide is selected from the group consisting of silicon carbide, boron carbide, tungsten carbide, and titanium carbide.

In a sixth preferred embodiment, a cleat assembly configured for attachment to the underside of a shoe for coupling engagement of the shoe to a bicycle pedal is provided. The cleat assembly comprises a cleat defining one or more pedal contact areas configured to be in facing opposition to a pedal surface. The one or more pedal contact areas each comprise at least a cleat portion that is made of a material having a measure of hardness that is greater than hardened steel.

In accordance with a first aspect, the one or more pedal contact areas is substantially planar.

In accordance with a second aspect, the one or more pedal contact area each comprises a shaped recess and the cleat portion is an element positionable within the shaped recess and substantially flush with the pedal contact area.

In accordance with a third aspect, the pedal contact area is positioned on the cleat to contact the pedal surface along a spindle axis.

In accordance with a fourth aspect, the pedal contact area is positioned on opposing sides of the cleat assembly to contact the surface on the bicycle pedal at both inboard and outboard locations along the spindle axis.

In accordance with a fifth aspect, the pedal contact area is located proximate one or both of a forward edge and a rear edge of the cleat assembly.

In accordance with a sixth aspect, the material comprises carbide.

In accordance with a seventh aspect, the carbide is selected from the group consisting of silicon carbide, boron carbide, tungsten carbide, and titanium carbide.

In a seventh preferred embodiment, a pedal assembly configured for attaching a cleat assembly disposed on the underside of a shoe for coupling engagement of the pedal assembly to the shoe is provided. The pedal assembly comprises a pedal body having one or more substantially planar surfaces. The planar surface(s) comprises a cleat contact area configured to be in facing opposition to a cleat. The cleat contact area comprises at least a pedal portion that is made of a material having a measure of hardness that is greater than hardened steel.

In accordance with a first aspect, the one or more cleat contact area comprises a shaped recess and the pedal portion is an element positionable within the shaped recess and substantially flush with the cleat contact area.

In accordance with a second aspect, the cleat contact area is positioned along a spindle axis of the pedal assembly.

In accordance with a third aspect, the cleat contact area is positioned on inboard and outboard locations along the spindle axis.

In accordance with a fourth aspect, the material comprises carbide.

In accordance with a fifth aspect, the carbide is selected from the group consisting of silicon carbide, boron carbide, tungsten carbide, and titanium carbide.

In an eighth preferred embodiment, a pedal and cleat assembly is described. The pedal and cleat assembly comprises a pedal body having a cleat contact area and a cleat body configured for coupling engagement with the pedal body. The cleat body has a pedal contact area in facing opposition to the cleat contact area. Coupling engagement of the cleat body to the pedal body causes respective portions of the cleat and pedal contact areas to be in direct physical contact. Either one or both of the respective portions of the cleat or pedal contact areas is made of a material having a measure of hardness that is greater than hardened steel.

In accordance with a first aspect, the portion of the cleat assembly is made of the material having a measure of hardness that is greater than hardened steel.

In accordance with a second aspect, the portion of the pedal assembly is made of the material having a measure of hardness that is greater than hardened steel.

In accordance with a third aspect, both the portions of the pedal and cleat assembly is made of the material having a measure of hardness that is greater than hardened steel.

In accordance with a fourth aspect, the portions are located along a spindle axis of the pedal assembly.

In accordance with a fifth aspect, the material comprises carbide.

In accordance with a sixth aspect, the carbide is selected from the group consisting of silicon carbide, boron carbide, tungsten carbide, and titanium carbide.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the inventions may be more readily understood by referring to the accompanying drawings in which:

FIG. 9A-9B are exploded perspective views of the two sides of the cleat assembly of FIG. 7.

FIG. 12C is a bottom plan view of the cleat assembly of FIG. 12A.

FIG. 12D is a left-side elevation view of the cleat assembly of FIG. 12A.

FIG. 12E is a top plan view of the cleat assembly of FIG. 12A.

FIG. 13C is a top plan view of the cleat body of FIG. 13A.

FIG. 13D is a sectional view of the cleat body of FIG. 13A, taken along the line 13D-13D in FIG. 13A.

Like numerals refer to like parts throughout the several views of the drawings.

DETAILED DESCRIPTION OF THE PREFERRED EMBODIMENTS

Figure 1:
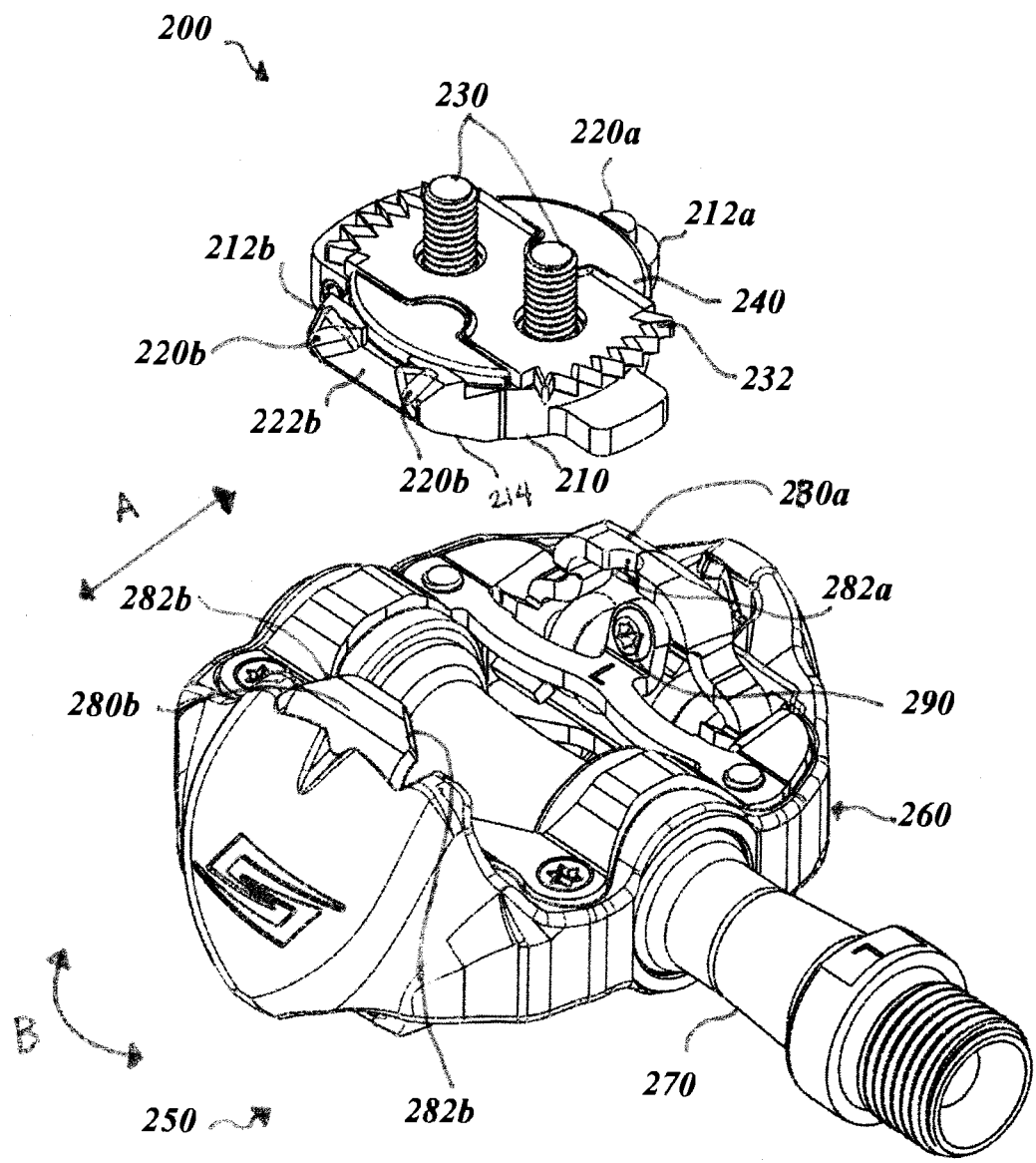
FIG. 1 is an exploded perspective view of another embodiment of a pedal and cleat assembly.

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

With reference now to the illustrative drawings, various embodiments of a bicycle pedal and cleat assembly are described and shown. The cleat assemblies described herein are designed to be secured to the underside of the sole of a rider's shoe (not shown), and are configured to be attachable to a double- or multi-sided pedal assembly. Because the pedal assembly is accessible from either one of the opposing sides (e.g., double-sided or multi-sided), the cleat assembly may be releasably secured to either one of the two sides of the pedal assembly, thereby obviating the need to "right" the pedal before attaching the cleat assembly thereto. In the various embodiments discussed herein, either right or left-sided pedal/cleat assemblies are described and illustrated in the drawings, with the understanding that the pedal assemblies are mere mirror images of one another. While the preferred embodiments encompass double-sided pedal assemblies, it is understood that the pedal assemblies described and depicted herein may also be embodied in a pedal assembly having only a single side or multiple sides (e.g., four sided) configured to releasably secure the cleat assembly.

FIGS. 1-4 illustrate an embodiment of a pedal and cleat assembly. The basic components and assembly of the cleat assembly 200 are similar to the cleats described in co-pending U.S. Ser. No. 12/917,322, filed Nov. 1, 2010, for a Pedal-Cleat Assembly, the entire contents of which are incorporated herein by reference as if fully set forth herein. The cleat assembly 200 generally comprises a generally ring-shaped cleat body 210 that defines the forward cleat projection 212a and the rearward cleat projection 212b. The forward and rearward cleat projections 212a, 212b are sized and configured to engage and to be retained by the respective forward and rearward cleat retainers, 280a, 280b of the pedal assembly 250. In the embodiment shown in FIGS. 1-4, the forward cleat retainer 280a may be contoured to correspond to the forward projection 212a and, more particularly, to the forward shaped insert 220a. Screws 230 serve to couple together the various components of the cleat assembly 200, such as the cleat body 210, the spacer 240, a disc-shaped body (not shown) and the base plate 232, and the screws 230 directly mount these cleat assembly 200 components securely to the underside of the sole of a rider's shoe (not shown).

The cleat assembly 200 includes additional structure that allows the main cleat body 210, and its forward and rearward projections 212a, 212b, to rotate by a selected, limited amount relative to the rider's shoe about a cleat rotation axis that is generally perpendicular to the shoe sole, without disengaging the cleat assembly 200 from the pedal assembly 250. This provides a float angle, the precise mechanism of which is described in U.S. Ser. No. 12/917,322, published as U.S. Pub. No. 2012-0103131 on Apr. 3, 2012 for "Pedal-Cleat Assembly", the entire contents of which are incorporated herein by reference in its entirety.

The pedal assembly 250 is shown to comprise an elongated spindle 270. One end of the elongated spindle 270 is configured to couple with and project laterally from a bicycle crank (not shown). The other end of the elongated spindle 270 is coupled to a pedal body 260 having identical upper and lower cleat support bases. The upper cleat support base is depicted in FIGS. 1 and 3 as comprising a forward cleat retainer 280a and a rearward cleat retainer 280b to form a seat for receiving and retaining forward and rearward cleat projections 212a, 212b.

Either one or both of the forward and the rearward cleat retainers 280a, 280b may be pivotally mounted to the pedal body. In the embodiment depicted in FIGS. 1 and 3, the rearward cleat retainer 280b is fixed relative to the cleat body and the forward cleat retainer 280a is pivotally mounted to and spring-biased toward the rearward cleat retainer 280b. Controlled adjustability of the amount of spring bias applied to the forward cleat retainer 280a is provided by an adjustment screw 290. Controllably rotating the adjustment screw 290 effectively tightens or loosens the spring tension to provides a controlled adjustment of spring tension.

Figure 3:
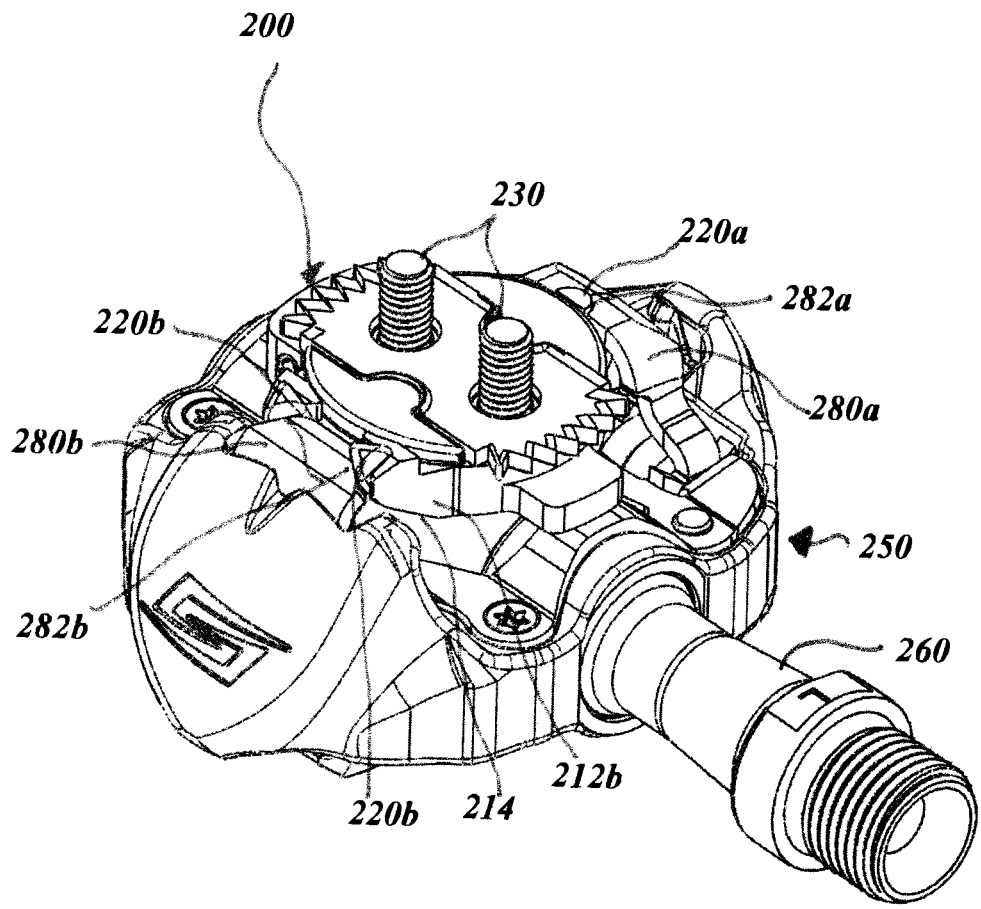
FIG. 3 is a perspective view of the pedal and cleat assembly of FIG. 1 coupled together in secure engagement.

It is understood that the opposite arrangement to the one depicted in FIGS. 1 and 3 may also be provided, in which the forward clear retainer 280a is fixed relative to the cleat body and the rearward cleat retainer 280b is pivotally mounted to and spring-biased toward the forward cleat retainer 280a. Alternatively, both the forward and rearward cleat retainers 280a, 280b may be pivotally mounted to and spring-biased toward one another.

Referring back to the embodiment depicted in FIGS. 1-4, in a preferred embodiment, one of the forward cleat retainer 280a and the forward projection 212a (and/or forward shaped insert 220a) is formed of hardened steel and the other one of the forward cleat retainer 280a and the forward projection 212a (and/or forward shaped insert 220a) is made of a material that has a measure of hardness that is greater than hardened steel. Alternatively or in addition, one of the rearward cleat projection 212b (and/or rearward shaped insert 220b) and the rearward cleat retainer 280b is formed of hardened steel and the other one of the rearward cleat projection 212b (and/or rearward shaped insert 220b) and the rearward retainer 280b is formed of a material that has a measure of hardness that is greater than hardened steel.

Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction.

Thus, in a preferred embodiment, the material has a Mohs hardness of greater than 7.0 and is made of a non-metal or a carbide, preferably selected from the group consisting of silicon carbide, boron carbide, tungsten carbide and titanium carbide.

The general principle here is that at least one (if not both) of the two frictional contacting surfaces involved in either the engagement or the release of the cleat and pedal assemblies is made of a material that has a measure of hardness that is greater than hardened steel (e.g., a Mohs hardness of greater than 7.0), preferably a non-metal or a carbide, preferably selected from the group consisting of silicon carbide, boron carbide, tungsten carbide and titanium carbide.

The frictional contacting surfaces involved in the engagement of the cleat and pedal assemblies comprise either or both pairs of (1) the forward cleat projection 212a (bottom surface or a first urging surface) and the facing outer surface of the forward cleat retainer 280a and (2) the rearward cleat projection 212b (bottom surface 214 or a first urging surface) and the facing outer surface of the rearward cleat retainer 280b.

The frictional contacting surfaces involved in the release of the cleat and pedal assembles comprise either or both pairs of: (1) the lateral surface of the forward cleat projection 212a and/or its shaped insert 220a (second urging surface) and the lateral surface of the forward cleat retainer 280a and (2) the lateral surface of the rearward cleat projection 212b and/or its shaped insert 220b (second urging surface) and the later surface 282 of the rearward cleat retainer 280b.

One application of this general principle is the avoidance of having both of the contacting surfaces of the same metallic material so as to avoid the problem of seizing, creating a cold weld or an adhesive surface between the two metals. In addition, the contacting surfaces must be of sufficient strength and durability to resist wear and tear.

The rearward cleat projection 212b of the cleat assembly 200 is depicted as comprising beveled first urging surface 214, shaped to facilitate engagement of the rearward projection 212b as the first urging surface 214 contacts and applies a downward force or contact upon the outer surface of the rearward retainer 280b (in a direction perpendicular to axis A). This corresponds to the first force or contact by the first urging surface 214 upon the outer surface of the rearward retainer 280b to urge either one or both of the forward and rearward cleat retainers 280a, 280b to a yielding position to permit the forward and rearward projections 212a, 212b to be secured by the forward and rearward cleat retainers 280a, 280b.

In the pedal assembly 250 depicted in FIGS. 1-4, only the forward cleat retainer 280a is moveable to provide the forward and rearward cleat retainers 280a, 280b in the yielding position. At least one of the abutting surfaces of the rearward cleat projection 212b and the rearward cleat retainer 280b are appropriately beveled or radiused, such that a downward pressure (in the direction perpendicular to A) forces the forward cleat retainer 280a in a forward direction against the yielding bias of the retaining portion. Once the rearward cleat projection 212b clears and snaps into position beneath the rearward cleat retainer 280b, the forward cleat retainer 280a spring biases and returns to an engagement state.

Again, at least one, if not both, of the first urging surface 214 and/or the outer surface of the rearward cleat retainer 280b is made of a material that is harder than hardened steel and, more preferably, is made of a carbide material.

Figure 2:
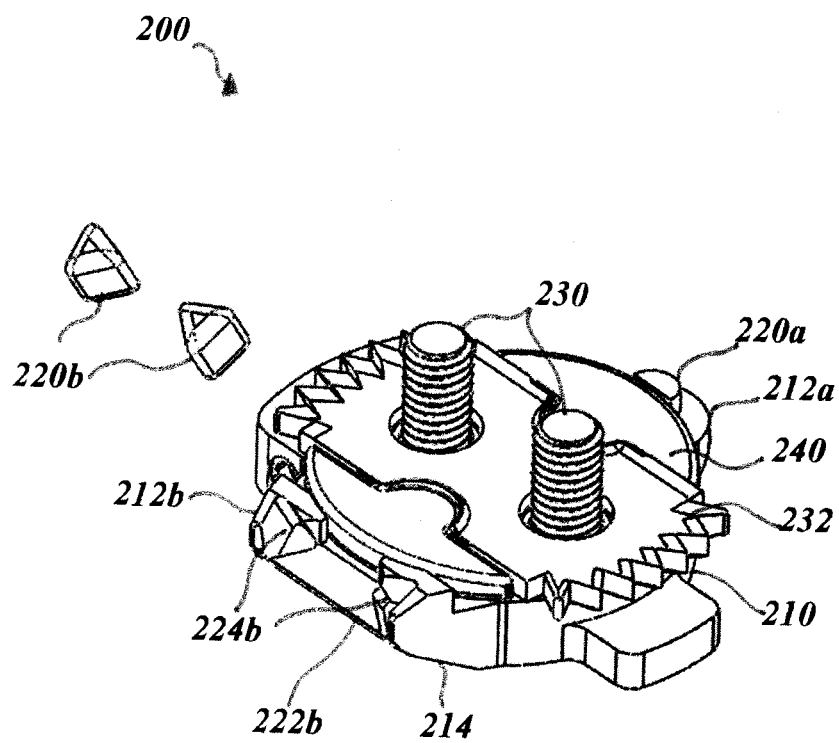
FIG. 2 is a perspective view of the cleat assembly of FIG. 1.

As further shown in FIG. 2, the rearward projection 212b comprises a pair of shaped inserts 220b to couple to correspondingly shaped recesses 224b formed on the opposing side of the beveled first urging surface 214 and contained within a cavity formed by the edge of the rearward projection 212b and the underside of the sole of the rider's shoe (not shown) to which the cleat assembly 200 is coupled. The shaped inserts 220b act as a cam surface for actuating the pedal assembly 250 and, more precisely, the forward and rearward cleat retainers 280a, 280b from an engagement position to a yielding position. The shaped inserts 220b are preferably made from a material that has a measure of hardness that is greater than hardened steel and, more preferably, of a carbide material. This permits a portion of the rearward retainer 280b to be made either of carbide or other appropriate material.

Figure 4A:
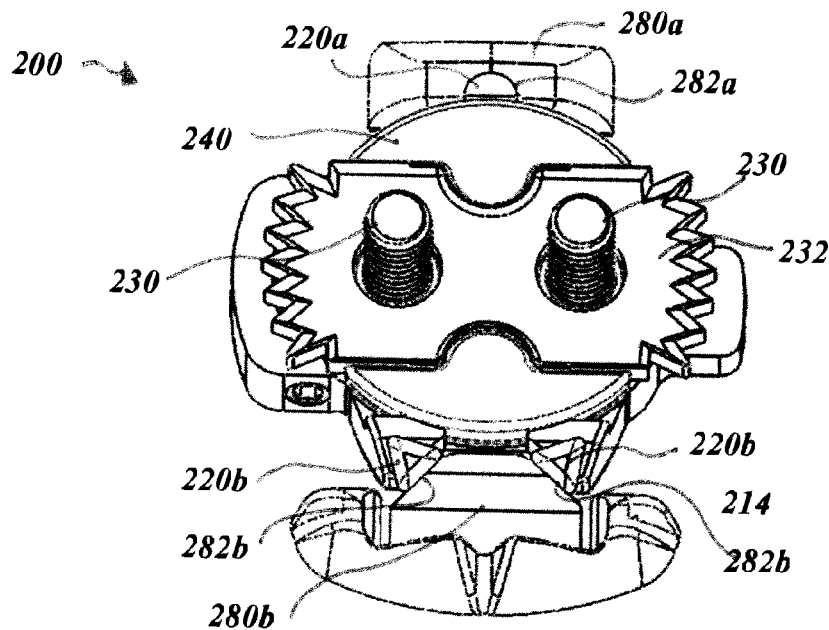
FIGS. 4A-4B illustrate the coupled pedal and cleat assembly and the release of the cleat assembly from the pedal assembly.
Figure 4B:
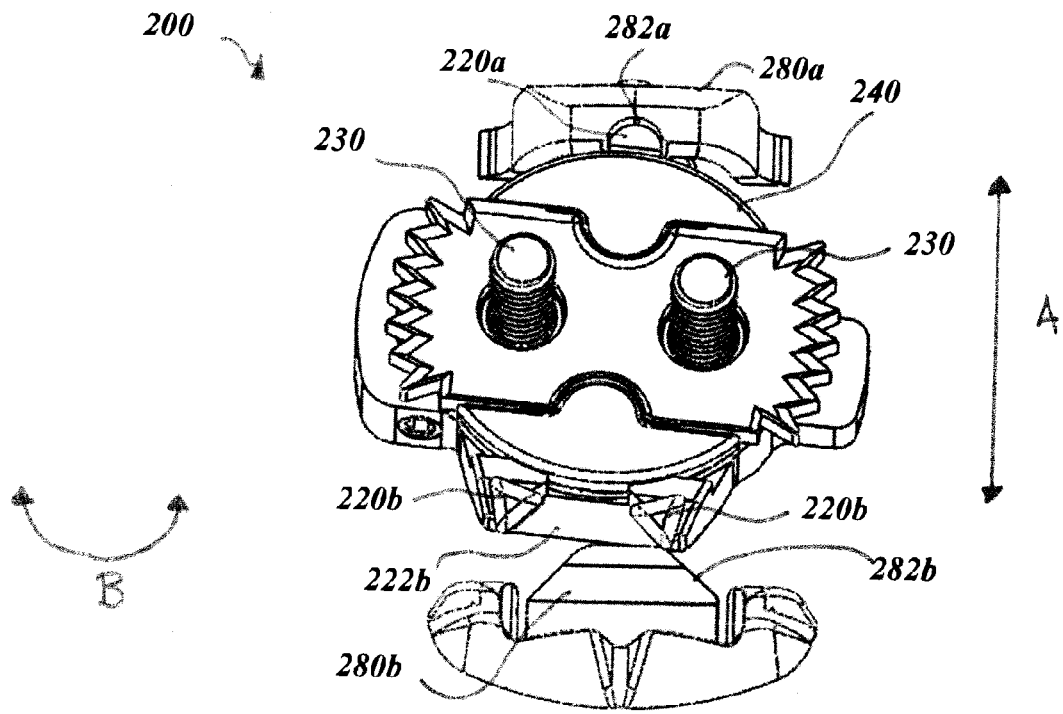

FIGS. 4A-4B depict the sequence of releasing the rear projection 212b (FIG. 4B) from a coupled cleat and pedal assembly (FIG. 4A). As can be seen in FIG. 4A, the lateral surfaces of the forward and rearward shaped inserts 220a, 220b act as a cam surface to permit disengagement of the secured or engaged cleat assembly from the pedal assembly by forcibly urging either one or both of the forward and reward retainers away from one another upon rotation of the cleat assembly 200 along the clockwise or counterclockwise direction B. Either one or both of the forward and rearward retainers 280a, 280b are configured to be urged to the yielding position to permit the secured forward and rearward projections 212a, 212b to be released upon the application of a second force or contact in the direction B by one upon the other of the second urging surface represented by the rearward shaped inserts 220b and a lateral surface of the rearward retainer 280b.

The rearward retainer 280b has shaped edges 282b which correspond to the contacting edges of the shaped inserts 220b. The shaped inserts 220b are angled such that a pivoting force or motion applied in either one of the direction B causes cam surfaces on the cleat assembly's forward cleat projection 220a and rearward cleat projection 220b to forcibly urge the respective forward and rearward cleat retainers 280a, 280b to a yielding position, apart from each other in the direction shown in A, against the yielding bias of the springs in the opposite direction. Eventually, the two cleat retainers 280a, 280b will be sufficiently spaced apart to release their retention of the two projections 212a, 212b. This releases the cleat assembly 200 from the pedal assembly 250.

In order to accommodate the rotational movement B of the cleat assembly 200 relative to the pedal assembly 250 in this process of release, the forward shaped insert 220a may be curved or semi-circular. In a preferred embodiment, either one or both of the forward shaped insert 220a and at least a contacting surface of the forward cleat retainer 282a is made of a carbide. In a preferred embodiment, very close tolerances are provided between the contacting surfaces of the shaped inserts 220a, 220b and the contacting surfaces of the forward and rearward retainers, 282a, 282b, respectively. In the embodiment depicted in FIGS. 1-4, the forward shaped insert 220a has a radiused surface that contacts a corresponding surface 282a of the forward cleat retainer 280a. The rearward shaped insert 220b has an angled surface that contacts a corresponding angled surface 282b of the rearward cleat retainer 280b.

Figure 5A:
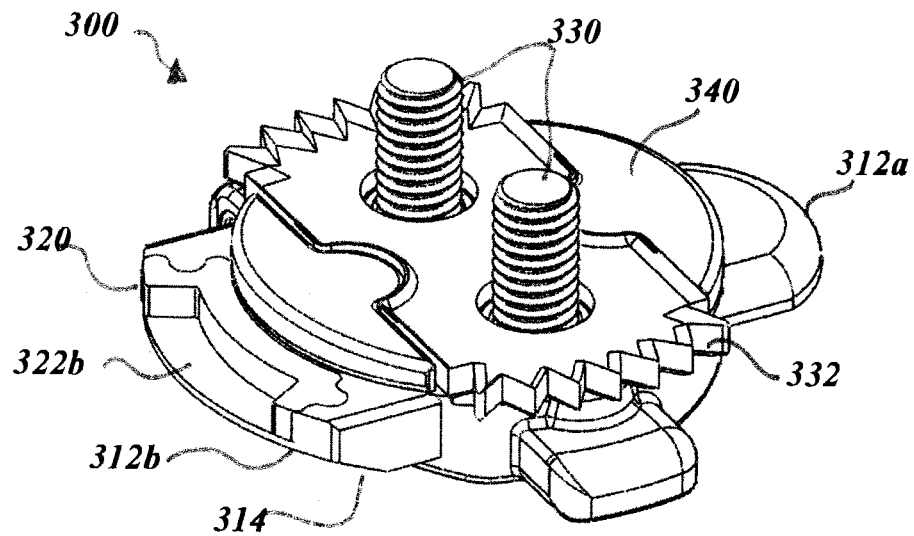
FIGS. 5A-5B are top perspective views of yet another embodiment of a cleat assembly.
Figure 5B:
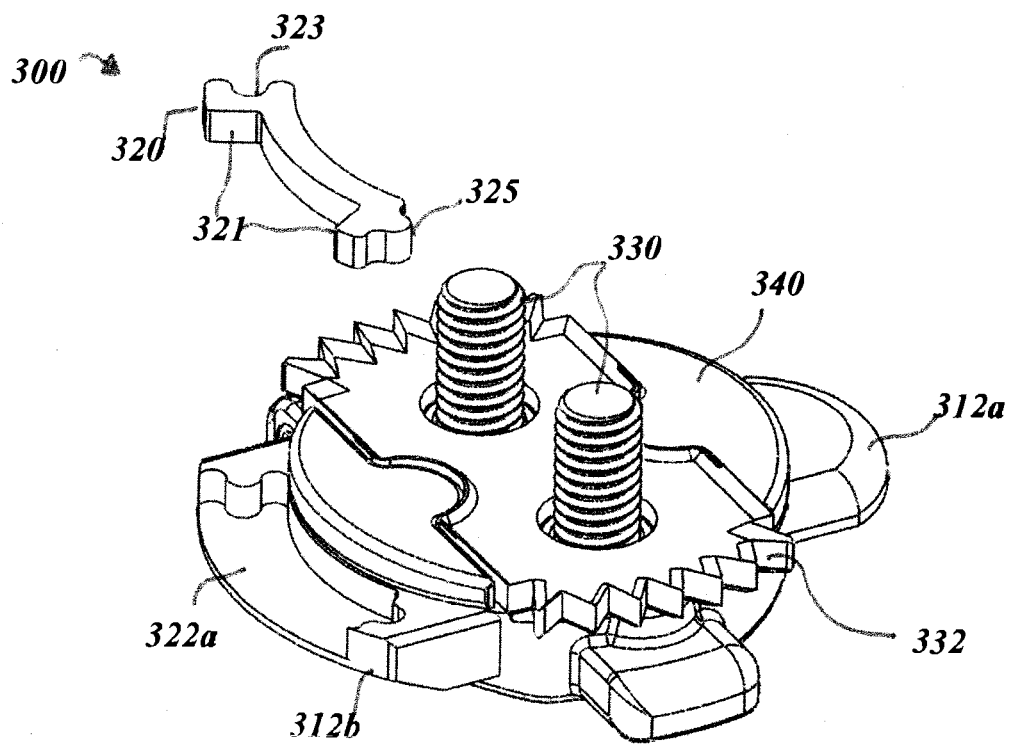
Figure 6A:
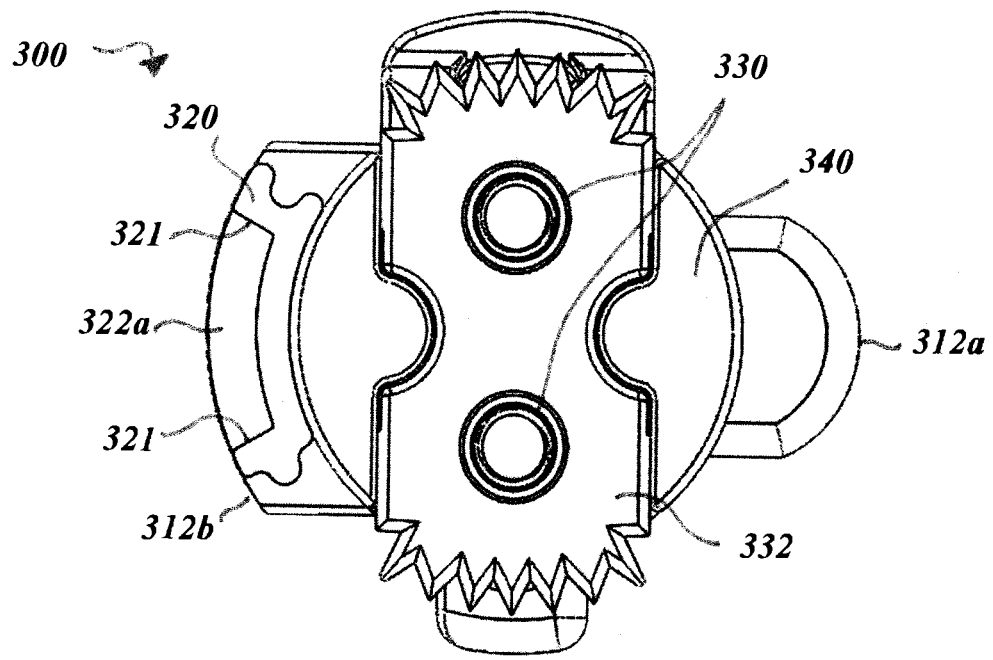
FIG. 6A is a top plan view of the cleat assembly of FIGS. 5A-B.
Figure 6B:
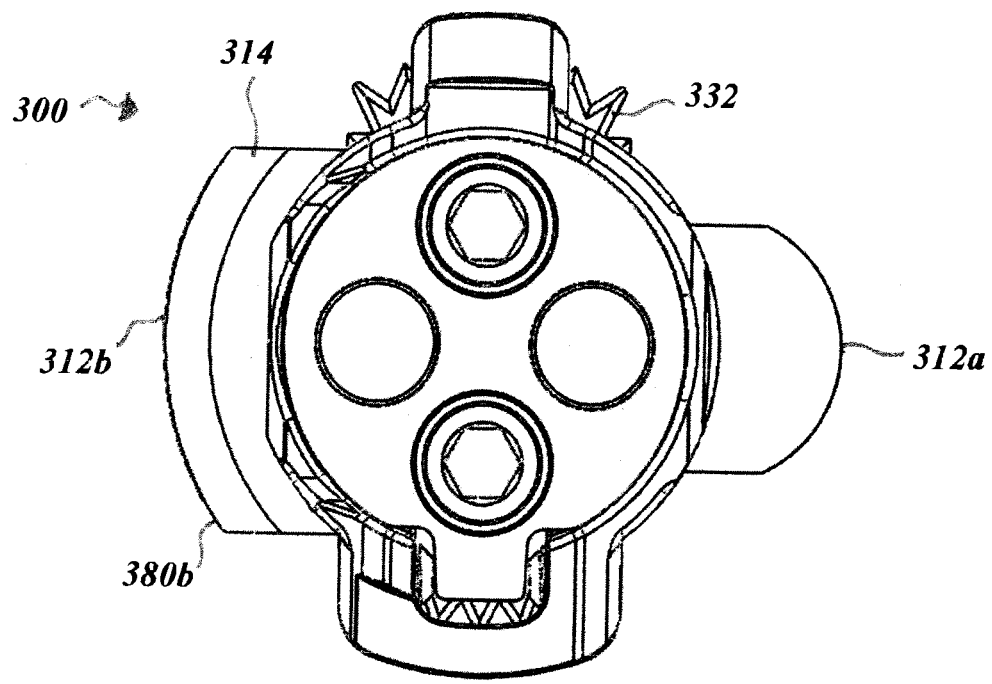
FIG. 6B is a bottom plan view of the cleat assembly of FIGS. 5A-B.
Figure 7:
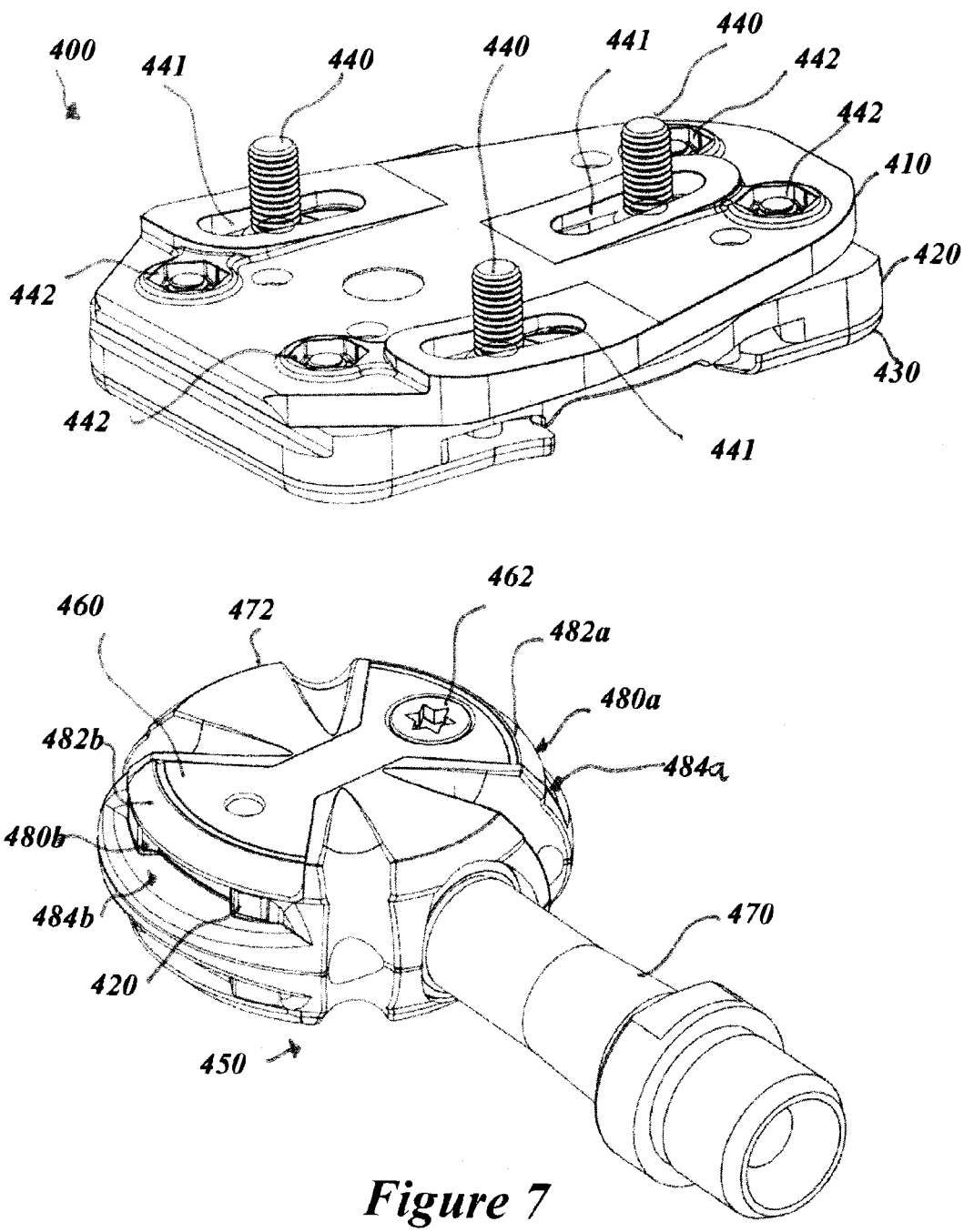
FIG. 7 is an exploded perspective view of a further embodiment of a pedal and cleat assembly.
Figure 8A:
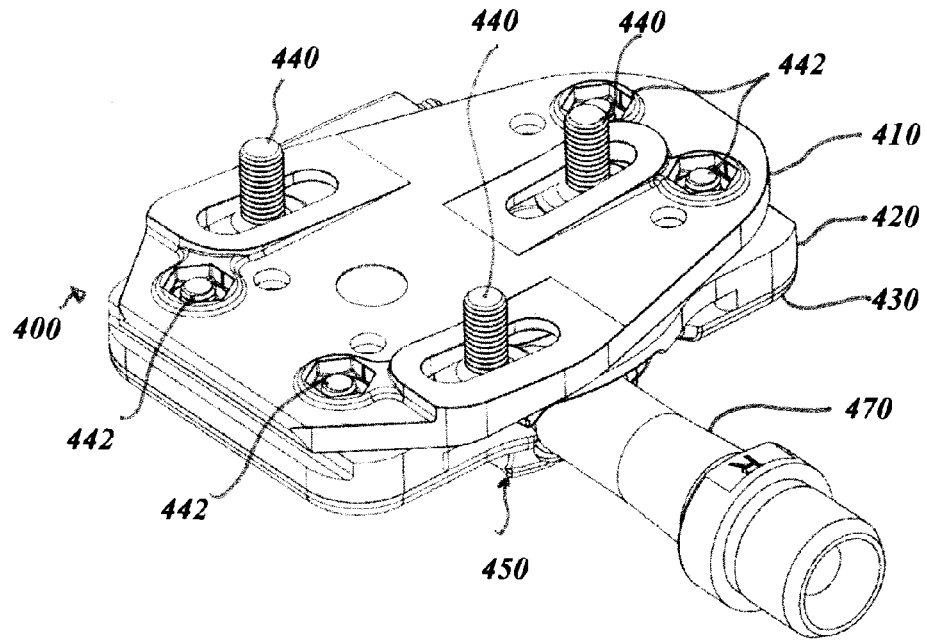
FIGS. 8A-8B are perspective views of the two sides of the assembled pedal and cleat assembly of FIG. 7.
Figure 8B:
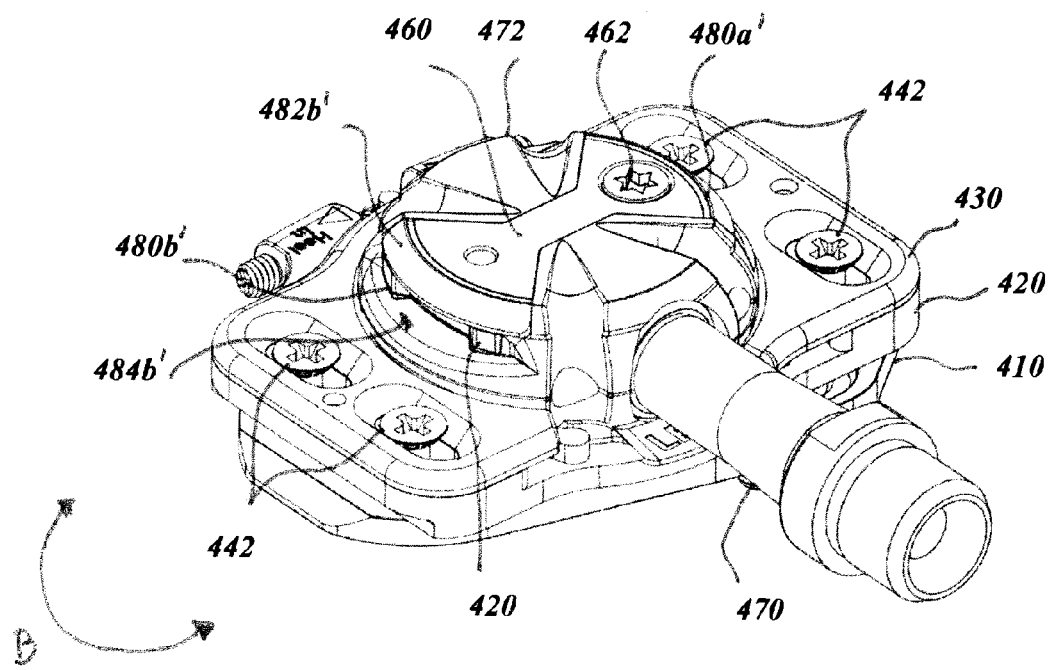
Figure 8C:
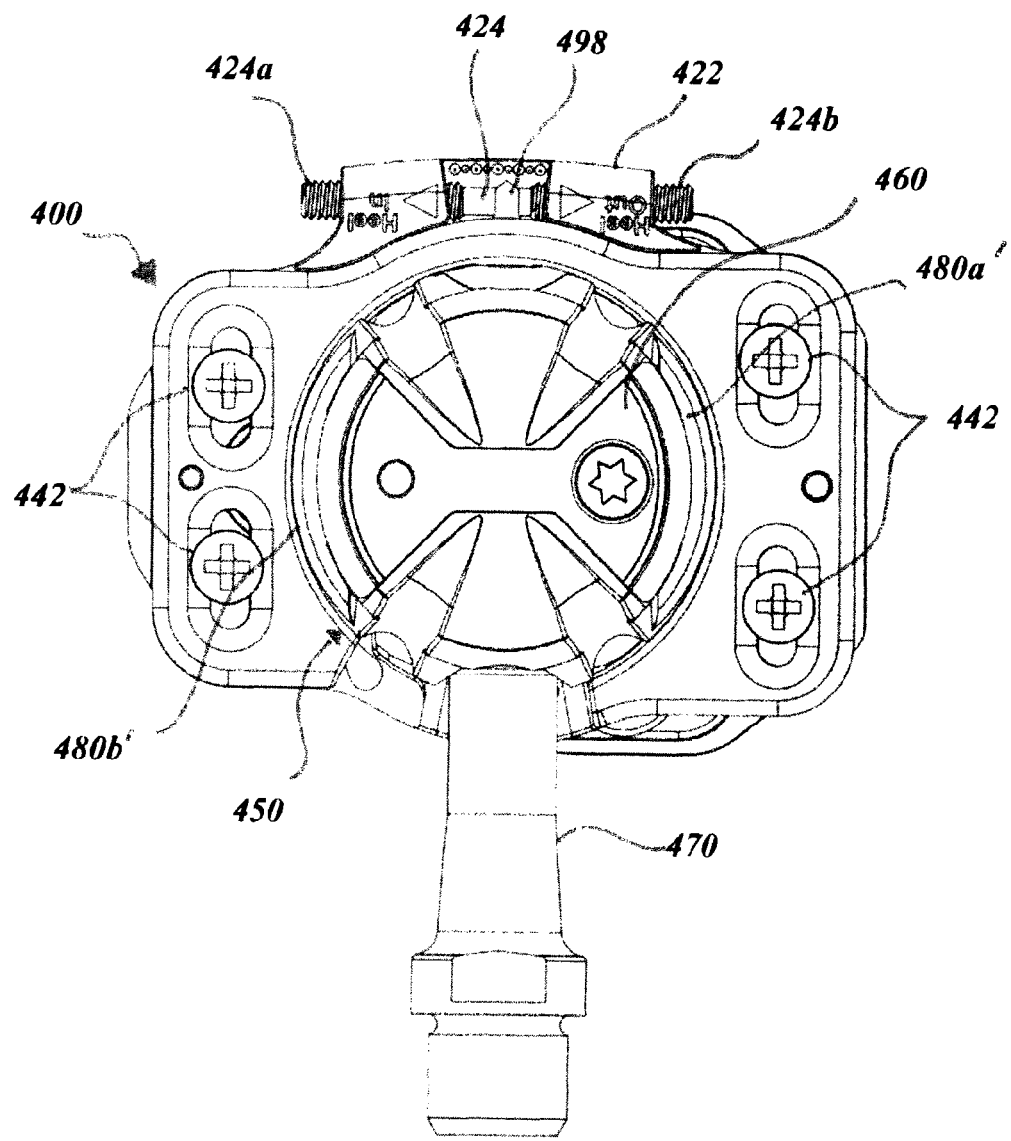
FIG. 8C is a top plan view of the assembled pedal and cleat assembly of FIG. 8B.
Figure 10:
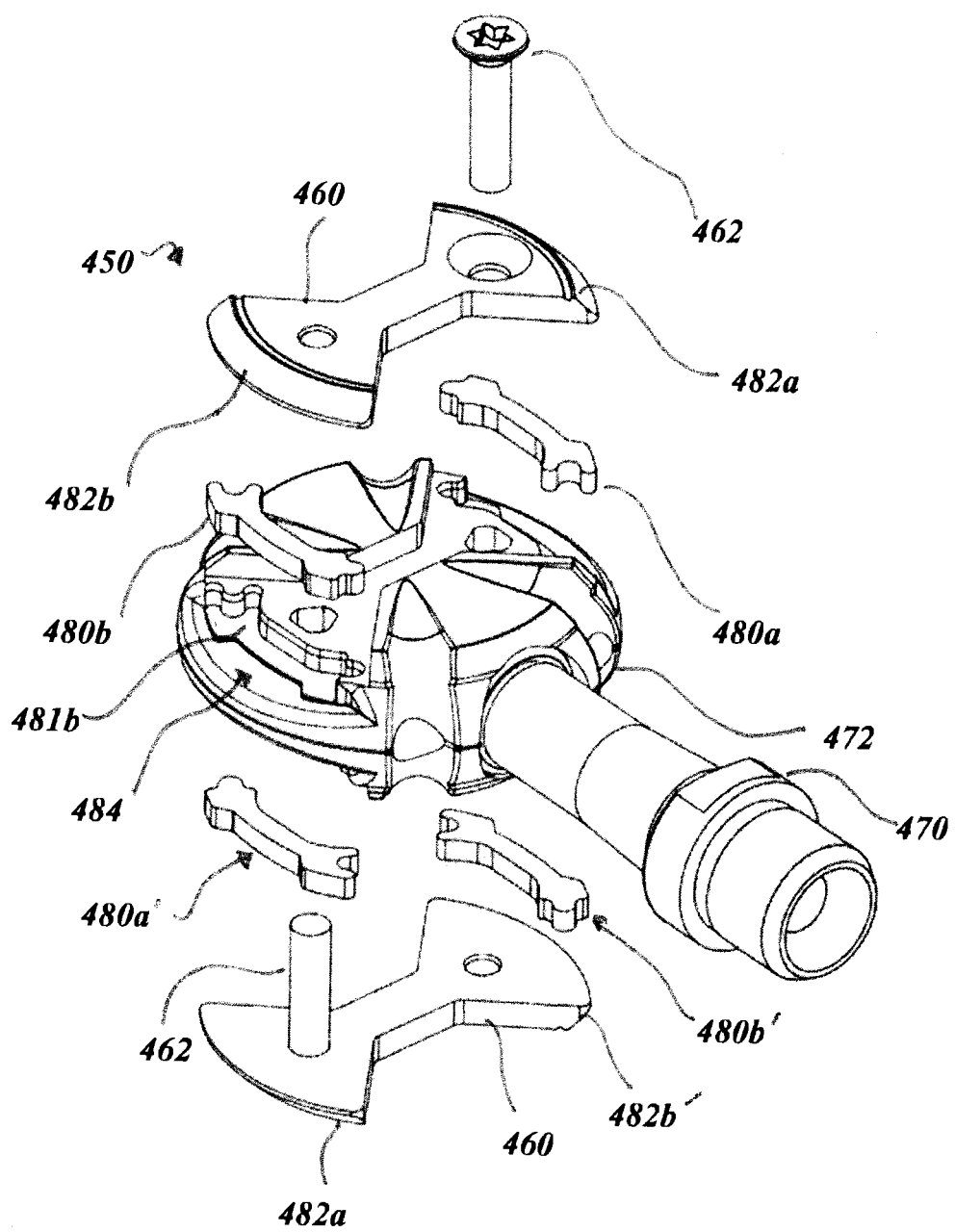
FIG. 10 is an exploded perspective view of the pedal assembly of FIG. 7.

FIGS. 5-6 depict yet another embodiment of a cleat assembly 300. As with the cleat assembly 200 depicted and described with respect to FIGS. 3-6, the cleat assembly 300 of FIGS. 5-6 comprises a cleat body 310, a spacer 340, a disc-shaped body (not shown) and a base plate 332 that is secured together and to the underside of the shoe's sole (not shown) by a pair of screws 330. The rearward projection 312b also comprises a beveled first urging surface 314. The cleat assembly 300 may be used in the same manner as the cleat assembly 200 in connection with the pedal assembly 250 depicted in FIGS. 1-4. Thus, the cleat assembly 300 may be interchangeable with the cleat assembly 200 with respect to the pedal assembly 250 depicted in FIGS. 1-4.

The cleat assembly 300 depicted in FIGS. 5-6, however, differs from cleat assembly 200 with respect to the configuration of the forward and rearward projections 312a, 312b. First, the forward projection 312a does not comprise a shaped insert and second, the rearward projection 312b comprises a single shaped insert 320 that covers the three lateral sides of the cavity 322b defined by the rearward projection 312b. The abutting surfaces of the shaped insert 320 and the rearward projection 312b are shaped (see FIG. 5B at 323, 325) so as to securely fix the shaped insert 320 within correspondingly shaped portions within the cavity 322a. It is understood that the rearward retainer 280 that engages and couples the cleat assembly 300 is shaped to fit in the cavity 322b that is defined by the shaped insert 320 that is fitted within the rearward projection 312b. In a preferred embodiment, the rearward retainer 280b is shaped to form close tolerances with the abutting surfaces 321 of the insert 320.

Thus, in the embodiment depicted in FIGS. 1-4, the pedal assembly 250 is described as comprising the forward and rearward retainers 280a, 280b and the cleat assembly 200 is described as comprising the forward and rearward projections 212a, 212b. It is understood, however, that the respective mechanisms be switched such that the pedal assembly 250 comprise the forward and rearward projections 212a, 212b and cleat assembly 200 comprise the forward and rearward retainers 280a, 280b.

In the embodiment depicted in FIGS. 5-6, the cleat assembly's first urging surface 314 and the pedal assembly's rearward cleat retainer 280b are forcibly contacted with one another to effectuate an engagement of the cleat and pedal assemblies. The engaged cleat assembly 200 may be released from the pedal assembly 250 by rotating the cleat assembly 200 in the direction B relative to the pedal assembly 250 such that a forcible contact is made between the lateral surface 321 of the cleat assembly's shaped insert 320 and the edge surface 282b of the rearward cleat retainer 280b upon a rotational movement along B to effectuate a release of the cleat and pedal assemblies.

In order to ensure that the mechanism of engagement and release of the cleat assembly to the pedal assembly occurs smoothly and without significant disruption, at least one of the two sets of contacting surfaces, the first of which comprise the first urging surface 314 and the outer surface 280b, and the second one of which comprise the cleat assembly's shaped insert 320 and the edge surface 282b of the rearward cleat retainer 280b, are preferably made of a material having sufficient strength to withstand the repeated application of force and a sufficiently low coefficient of friction to permit the smooth relative sliding of the contact surfaces. Significantly, the material must retain these properties under a variety of conditions, e.g., when it is wet or dirty.

In a preferred embodiment, either one or both of the sliding contacting surfaces is/are made of a material having a measure of hardness that is greater than hardened steel. Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction.

Referring now to the particular embodiment depicted in FIGS. 5-6, the shaped insert 320 is preferably made of a material having a measure of hardness that is greater than hardened steel, and preferably a carbide material, and the remainder of the rearward projection 312b is made of a metal, preferably hardened steel.

Generally, either one or both of the shaped insert 320 and/or the second cleat retainer 280b is/are made of a material that has a hardness greater than hardened steel. In embodiments where only one of the two contacting surfaces is made of carbide, it is preferably the shaped insert 320. The other one of the two contacting surfaces may be made of a suitable metal or plastic, preferably hardened steel.

FIGS. 7-11 depict a further embodiment of a cleat and pedal assembly 400, 450. The cleat assembly 400 includes a base plate 410, preferably made of a lightweight material such as plastic, configured to be secured to the shoe's sole (not shown) by screws 440 extending through three elongated openings. The cleat assembly 400 further includes a spring housing 420, preferably made of plastic, and a bottom plate 430, preferably made of a metal, such as aluminum or steel, which are secured together by four screws 422 to the base plate 410. The spring housing 420 and the bottom plate 430 together define a circular central opening (see FIGS. 9A-9B) sized and shaped to receive a portion of the pedal assembly 450. A spring or retainer portion 490 is mounted between the spring housing 420 and the bottom plate 430 for releasably engaging the pedal assembly 450 when the cleat assembly 400 is positioned over the pedal assembly 450.

The pedal assembly 450 is generally disk-shaped and symmetrical along a bisecting plane, defining an upper side (engaged to the cleat 400) and an identical lower side (not engaged to the cleat 400 and designated by '). This configuration permits the cleat to be releasably attached to either side of the pedal. The pedal 450 includes a disk-shaped pedal body 472 for attachment to a pedal crank (not shown) via a spindle 470. A planar, bow-tie shaped insert 460 is located within an identically-shaped shallow recess formed in the pedal body's outer planar surface and secured to the pedal body 472 by screws 462. The insert 460 extends diametrically across the entire outer surface and the insert's upper surface is coplanar with the pedal body's outer surface.

Engagement edges 484a, 484b in the form of recesses are defined in the pedal body 472 beneath the opposite ends 482a, 482b of the planar inserts 460. The engagement edges 484a, 484b are configured and sized to be engaged by portions of the cleat assembly 400 to releasably secure it to the pedal assembly 450. Cam inserts 480a and 480b are located beneath the respective opposite ends 482a, 482b and secured within similarly shaped recesses 481a, 481b. The cam inserts 480a and 480b are confined within these similarly shaped recesses by securement of the overlying planar inserts 460 and cooperate with the spring 490 of the cleat assembly 400 to facilitate a convenient release of the cleat assembly 400 from the pedal assembly 450.

Figure 11:
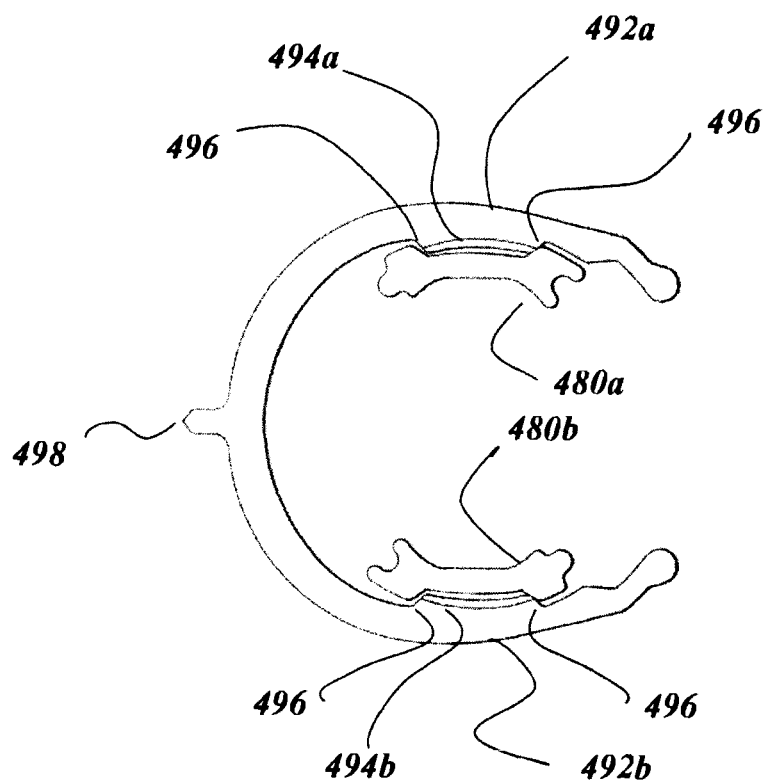
FIG. 11 is a plan view showing the engagement of the spring of the cleat assembly and the cam member disposed in the pedal assembly.

FIG. 11 illustrates the relationship between the spring 490 and the cam inserts 480a, 480b when the cleat assembly 400 is coupled to the pedal assembly 450. The horseshoe shaped spring 490 is depicted here as being in the engagement position, to which it is resiliently biased, and comprises a forward and rearward leg 492a, 492b configured to engage the pedal assembly 450 beneath the opposite ends 482a, 482b, respectively. In particular, the inward projections 494a, 494b of the forward and rearward legs 492a, 492b, respectively, are received in correspondingly shaped recesses of the cam inserts 480a, 480b. After the spring 490 is engaged with the cam inserts 480a, 480b of the pedal assembly 450, the cleat assembly 400 is free to rotate relative to the pedal to a limited extent in both the clockwise and counterclockwise directions. During this limited rotation, the spring 490 remains locked to the pedal assembly 450 and the remainder of the cleat assembly 400 rotates relative to the spring 490. The amount of rotation may be limited when a finger 498 projecting outwardly from the spring's mid-point reaches one of two adjustable screw sets 424a, 424b. The float angle is increased or decreased by adjusting the screws.

The underside of the spring's inward projections 494a, 494b defines a first spring urging surface that contacts the opposite ends 482a, 482b, respectively, of the pedal assembly 450 before the cleat assembly 400 is secured to the pedal assembly 450. In a preferred embodiment, the contacting surfaces of the first spring urging surfaces and the pedal assembly's opposite ends 482a, 482b are shaped to facilitate the sliding movement of the spring 490 across the opposite ends 482a, 482b and to urge the forward and rearward legs 492a, 492b apart to a spring yielding position. To that end, the contacting surfaces may have complementary radiused or angled beveled surfaces. Once the forward and rearward legs 492a, 492b clear the opposite ends 482a, 482b, respectively, the spring 490 snaps to an engagement position to thereby secure the cleat assembly 400 to the pedal assembly 450.

The spring's inward projections 494a, 494b further comprise second spring urging surfaces 496 defined along the lateral surface. The second spring urging surfaces 496 are configured and shaped to be received within the groove defined by the cam inserts 480a, 480b to further secure the cleat assembly 400 to the pedal assembly 450. Rotation of the cleat assembly 400 relative to the pedal assembly 450, in either direction, causes the second spring urging surfaces 496 to contact the cam inserts 480a, 480b and urge the forward and rearward legs 492a, 492b apart to a spring yielding position. To that end, the contacting surfaces of the second spring urging surfaces 496 and the cam inserts 480a, 480b may be shaped to facilitate the movement of the inward projections 494a, 494b out of the groove defined by the cam inserts 480a, 480b to urge the forward and rearward legs 492a, 492b apart to a yielding position and thereby permit release of the spring 490 and thus the cleat assembly 400 from the pedal assembly 450.

In a preferred embodiment, the spring 490 is made of a durable and resilient material. In a preferred embodiment, the spring 490 is made of hardened steel and the cam inserts 480a, 480b are made of a material that has a measure of hardness that is greater than hardened steel (e.g., a Mohs hardness of greater than 7.0), preferably a carbide material as described above.

Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction.

FIGS. 12A-12E illustrate an embodiment of a cleat assembly 500 for attachment to a rider's left shoe, the cleat assembly for attachment to the rider's right shoe being a mirror image of the cleat assembly 500. The cleat assembly 500 comprises a generally ring-shaped cleat body 510 that defines a forward cleat projection 512a and a rearward cleat projection 512b. The forward and rearward cleat projections 512a, 512b are sized and configured to engage and to be retained by the respective forward and rearward cleat retainers, 280a, 280b of the pedal assembly 250 (FIG. 1). The forward cleat retainer 280a may be contoured to correspond to the forward cleat projection 512a and, more particularly, to a forward shaped insert 520a on the forward cleat projection 512a. Screws 530 couple together the various components of the cleat assembly 500, such as the cleat body 510, a spacer 540, a disc-shaped body 542, and a base plate 532. The screws 530 directly mount these cleat assembly 500 components securely to the underside of the sole of a rider's shoe (not shown).

In a preferred embodiment, one of the forward cleat retainer 280a and the forward cleat projection 512a (and/or the forward shaped insert 520a) is formed of hardened steel, and the other one of the forward cleat retainer 280a and the forward cleat projection 512a (and/or the forward shaped insert 520a) is made of a material that has a measure of hardness that is greater than that of hardened steel. Alternatively or additionally, one of the rearward cleat projection 512b (and/or the rearward shaped inserts 520b, 521b) and the rearward cleat retainer 280b is formed of hardened steel, and the other one of the rearward cleat projection 512b (and/or the rearward shaped inserts 520b, 521b) and the rearward cleat retainer 280b is formed of a material that has a measure of hardness that is greater than that of hardened steel.

The frictional contacting surfaces involved in the engagement of the cleat and pedal assemblies comprise either or both pairs of: (1) the forward cleat projection 512a (bottom surface or a first urging surface) and the facing outer surface of the forward cleat retainer 280a; and (2) the rearward cleat projection 512b (bottom surface 514 or a first urging surface) and the facing outer surface of the rearward cleat retainer 280b.

The frictional contacting surfaces involved in the release of the cleat and pedal assembles comprise either or both pairs of: (1) the lateral surface of the forward cleat projection 512a and/or its shaped element 520a (second urging surface) and the lateral surface of the forward cleat retainer 280a; and (2) the lateral surface of the rearward cleat projection 512b and/or its shaped element 520b, 521b (second urging surface) and the lateral surface 282 of the rearward cleat retainer 280b.

The rearward cleat projection 512b of the cleat assembly 500 comprises a beveled first urging surface 514, shaped to facilitate engagement of the rearward cleat projection 512b as the first urging surface 514 contacts and applies a downward force or contact upon the outer surface of the rearward cleat retainer 280b. This corresponds to the first force or contact by the first urging surface 514 upon the outer surface of the rearward cleat retainer 280b to urge either one or both of the forward and rearward cleat retainers 280a, 280b to a yielding position to permit the forward and rearward cleat projections 512a, 512b to be secured by the forward and rearward cleat retainers 280a, 280b.

The rearward cleat projection 512b comprises a pair of shaped elements 520b, 521b received in correspondingly shaped recesses 524b, 525b that are formed on the opposing side of the beveled first urging surface 514 and are contained within a cavity formed by an edge of the rearward cleat projection 512b and the underside of the sole of the rider's shoe (not shown) to which the cleat assembly 500 is coupled. The shaped elements 520b, 521b act as a cam surface for actuating the pedal assembly 250 and, more precisely, the forward and rearward cleat retainers 280a, 280b, from an engagement position to a yielding position. The shaped elements 520b, 521b are preferably made of a material that has a measure of hardness that is greater than hardened steel and, more preferably, of a carbide material. This permits a portion of the rearward cleat retainer 280b to be made either of carbide or other appropriate material.

Figure 12B:
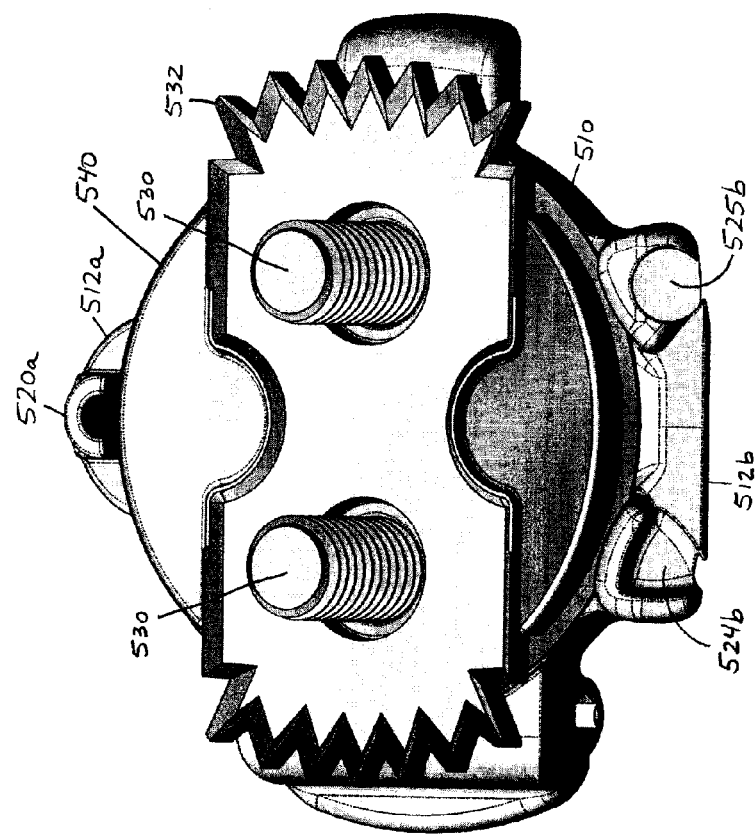
FIG. 12B is a top perspective view of the cleat assembly of FIG. 12A, omitting the two shaped elements to show the shaped recesses formed on the cleat body.
Figure 12A:
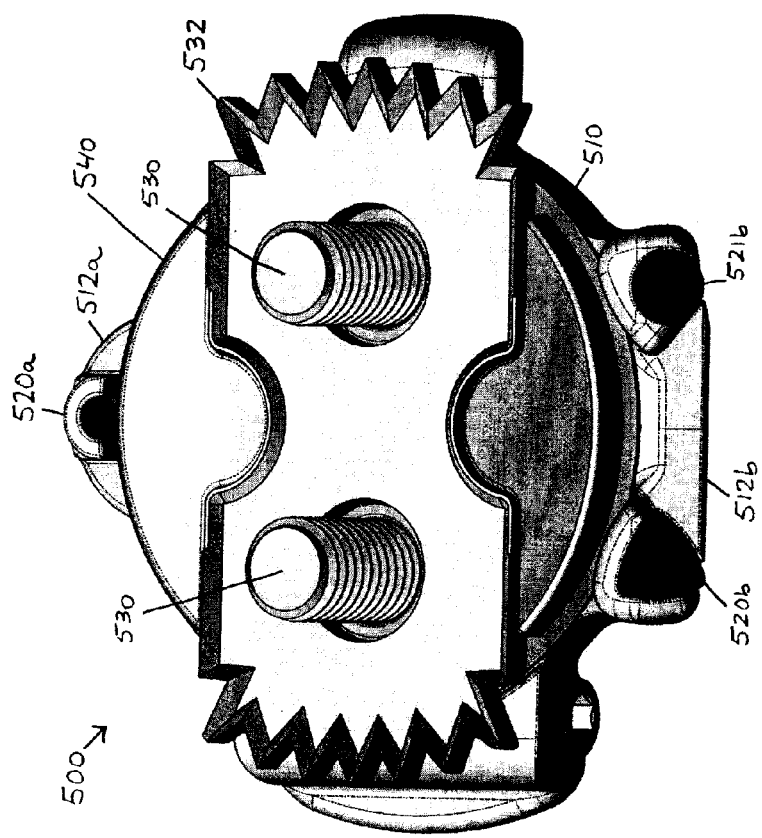
FIG. 12A is a top perspective view of a further embodiment of a cleat assembly, showing two shaped elements received in correspondingly shaped recesses formed on a cleat body.
Figure 13A:
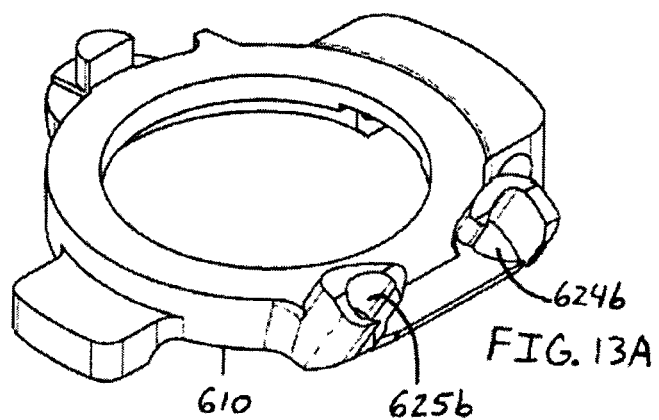
FIG. 13A is a top perspective view of an embodiment of a ring-shaped cleat body.
Figure 13B:
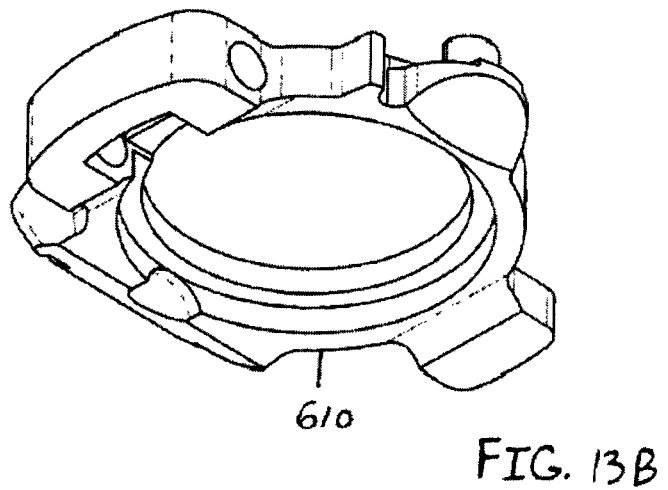
FIG. 13B is a bottom perspective view of the cleat body of FIG. 13A.
Figure 13E:
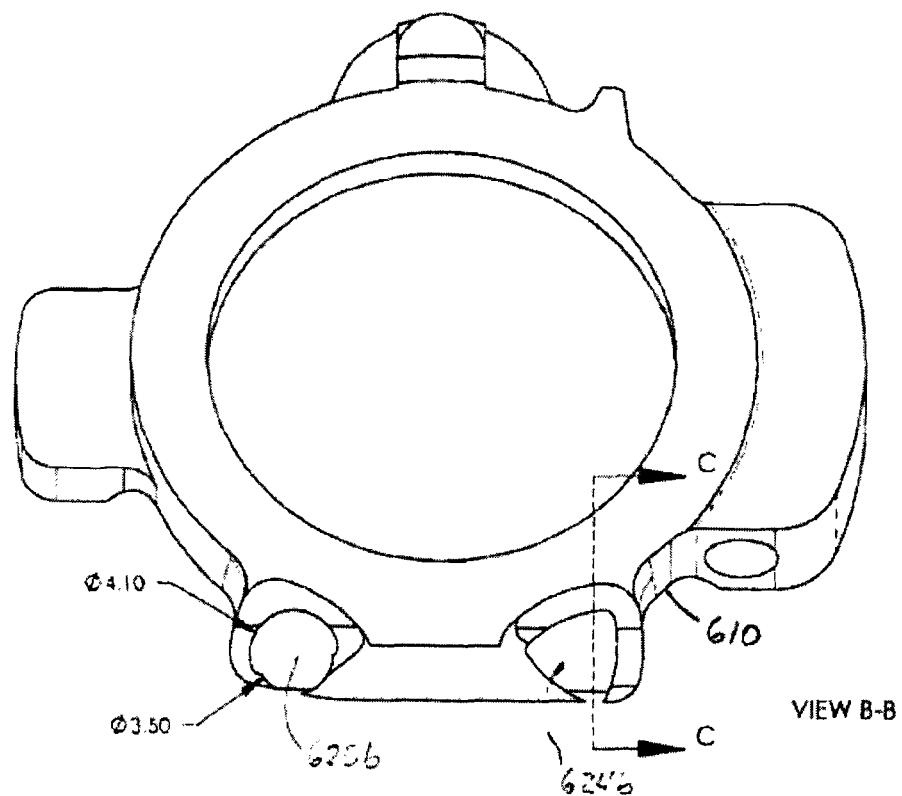
FIG. 13E is another top perspective view of the cleat body of FIG. 13A.
Figure 13F:
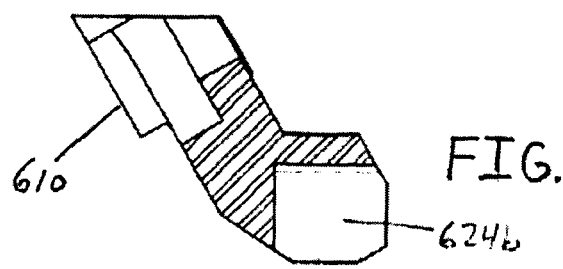
FIG. 13F is a sectional view of the cleat body of FIG. 13A, taken along the line 13F-13F in FIG. 13E.
Figure 13G:
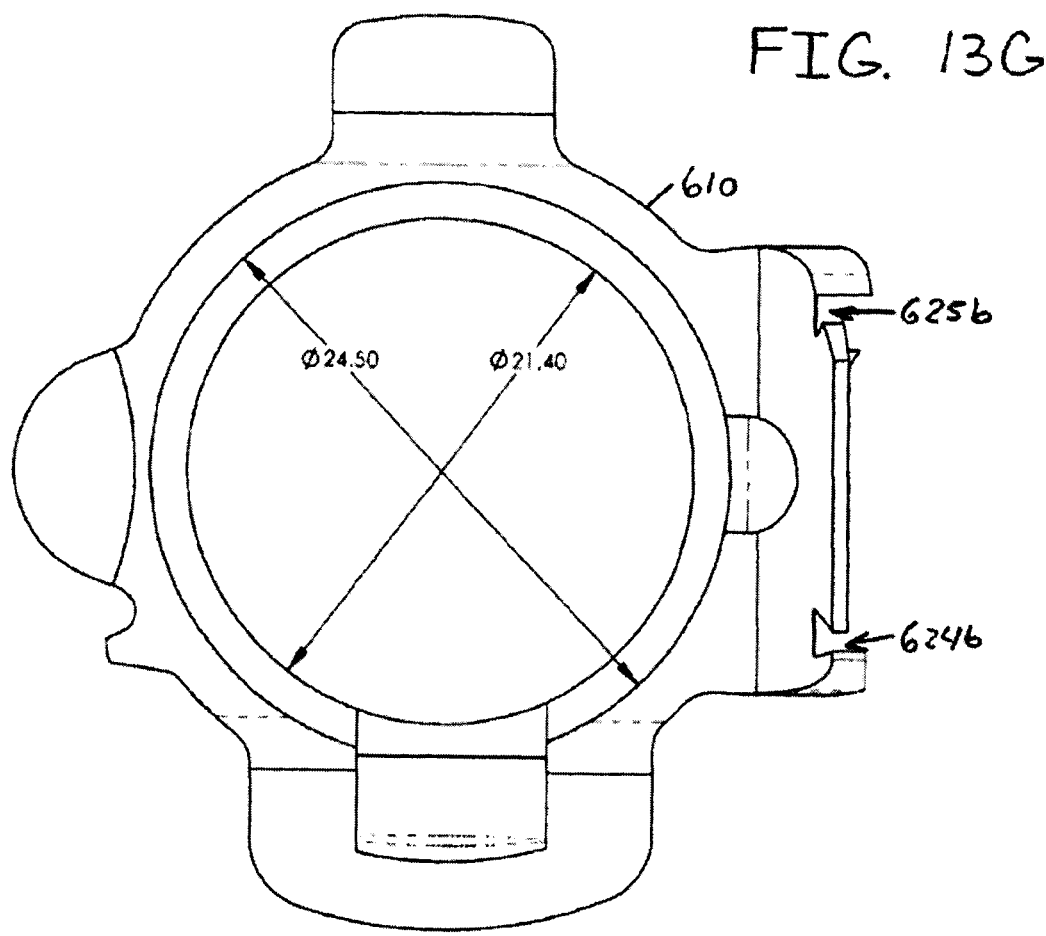
FIG. 13G is a bottom plan view of the cleat body of FIG. 13A.

FIG. 12A is a top perspective view of the cleat assembly 500, showing the two shaped elements 520b, 521b received in the correspondingly shaped recesses 524b, 525b. FIG. 12B is a top perspective view of the cleat assembly 500, omitting the two shaped elements 520b, 521b to show the shaped recesses 524b, 525b. As shown in FIGS. 12A and 12B, the shaped elements 520b and the shaped recess 524b on the inner-release side of the cleat assembly 500 (the left side in FIGS. 12A and 12B) have a generally triangular shape, similar to the shaped insert 220b and shaped recess 224b shown in FIG. 2. In contrast, the shaped elements 521b and the shaped recess 525b on the outer-release side of the cleat assembly 500 (the right side in FIGS. 12A and 12B) have a generally circular or cylindrical shape.

In one embodiment, the shaped elements 521b has a generally cylindrical shape with rounded edges. When received in the shaped recess 525b, the cylindrical elements 521b is configured to rotate or articulate about an axis to facilitate releasing the cleat assembly 500 from a bicycle pedal. The rotation or articulation reduces or eliminates sliding friction between the shaped elements and the lateral surface 282 of the rearward cleat retainer 280b as the cleat assembly is released from the bicycle pedal. The sliding friction is replaced with rolling resistance, which makes it easier for a rider to pivot the cleat assembly 500 with respect to a bicycle pedal in order to release the cleat assembly 500 from the pedal.

In one embodiment, the cleat assembly 500 has both types of shaped elements 520b and 521b. In other embodiments, the cleat assembly 500 has two triangular elements 520b and two correspondingly shaped recesses 524b (similar to FIGS. 1-4), or has two cylindrical elements 521b and two correspondingly shaped recesses 525b.

In one embodiment, a small brass shim surrounds the cylindrical elements 521b to provide better lubrication during rotation or articulation.

FIGS. 13A-13G illustrate an embodiment of a ring-shaped cleat body 610 for use in the right-shoe version of the cleat assembly 500. The shaped recesses 624b, 625b correspond to the shaped recesses 524b, 525b in FIGS. 12A-12E.

Figure 14A:
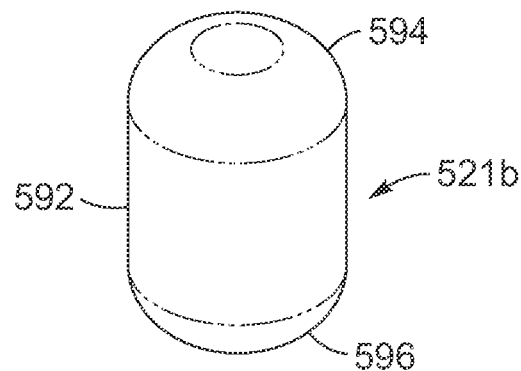
FIG. 14A is a perspective view of an embodiment of a cylindrical element for a cleat assembly.
Figure 14B:
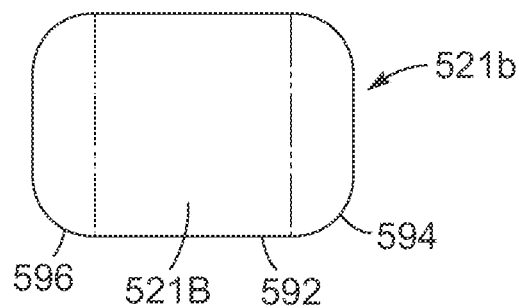
FIG. 14B is a side elevation view of the cylindrical element of FIG. 14A.
Figure 14C:
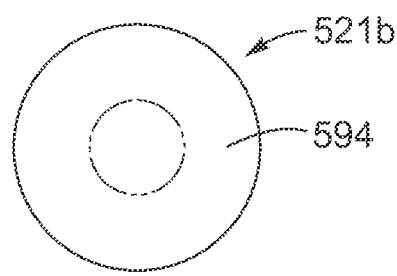
FIG. 14C is a top plan view of the cylindrical element of FIG. 14A, the bottom plan view being the same as the top plan view.
Figure 15A:
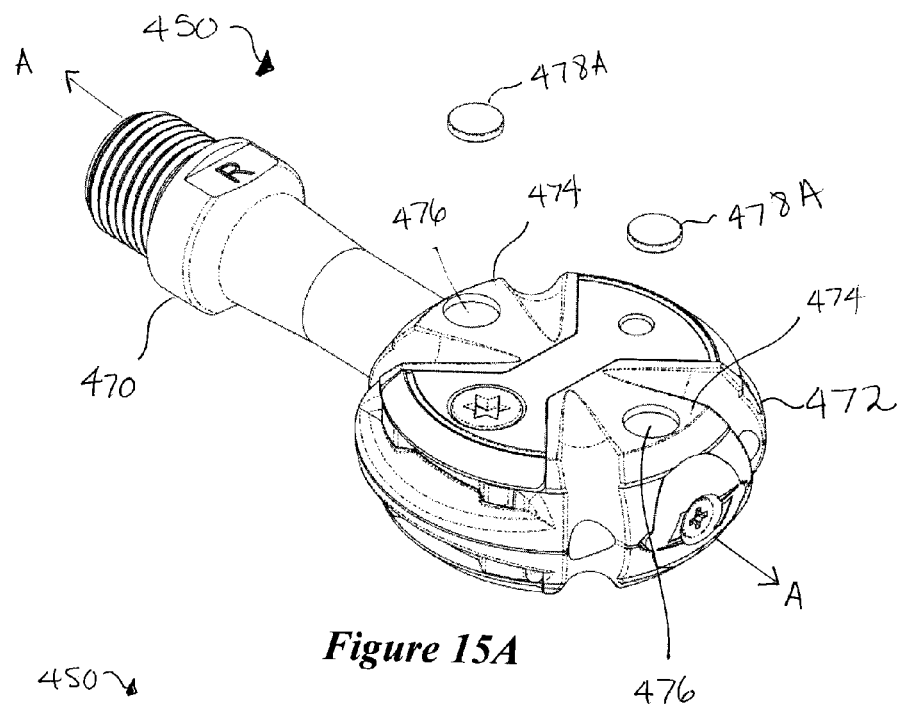
FIG. 15A is an exploded perspective view of an embodiment of a pedal assembly and the cleat contact elements.
Figure 15B:
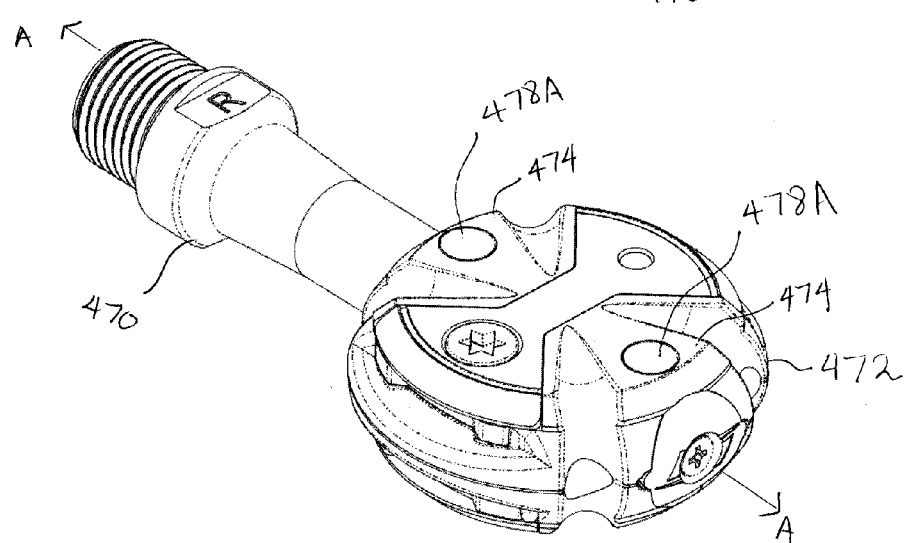
FIG. 15B is a perspective view of the pedal assembly of FIG. 15A with the cleat contact elements secured thereon.
Figure 15C:
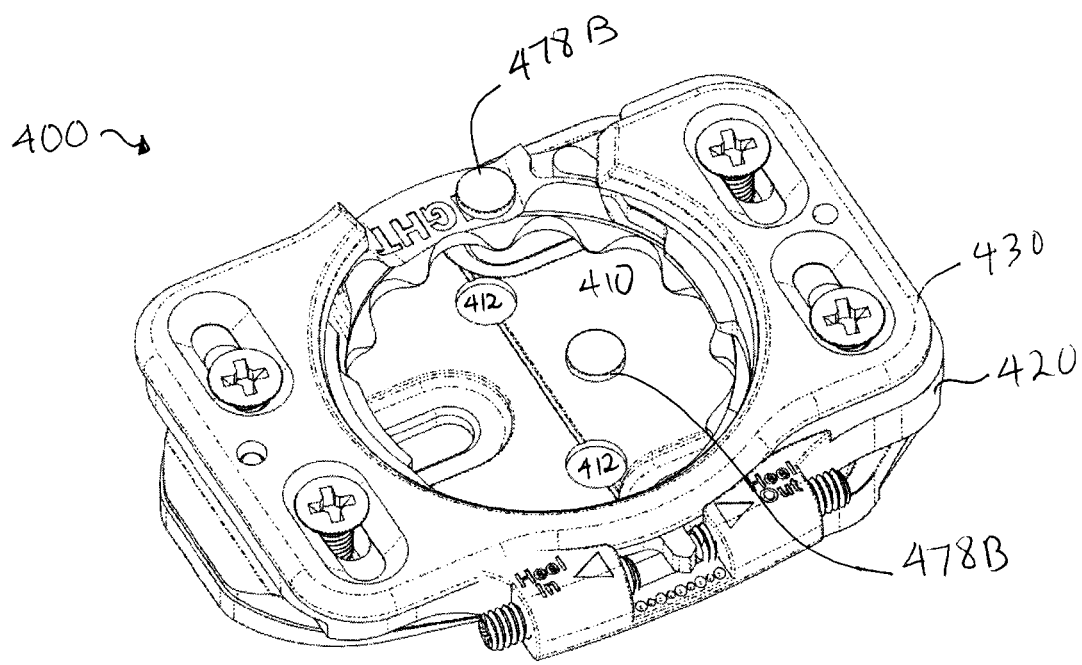
FIG. 15C is an exploded perspective view of an embodiment of a cleat assembly and the pedal contact elements, the cleat assembly corresponding to the pedal assembly of FIGS. 15A-15B.
Figure 15D:
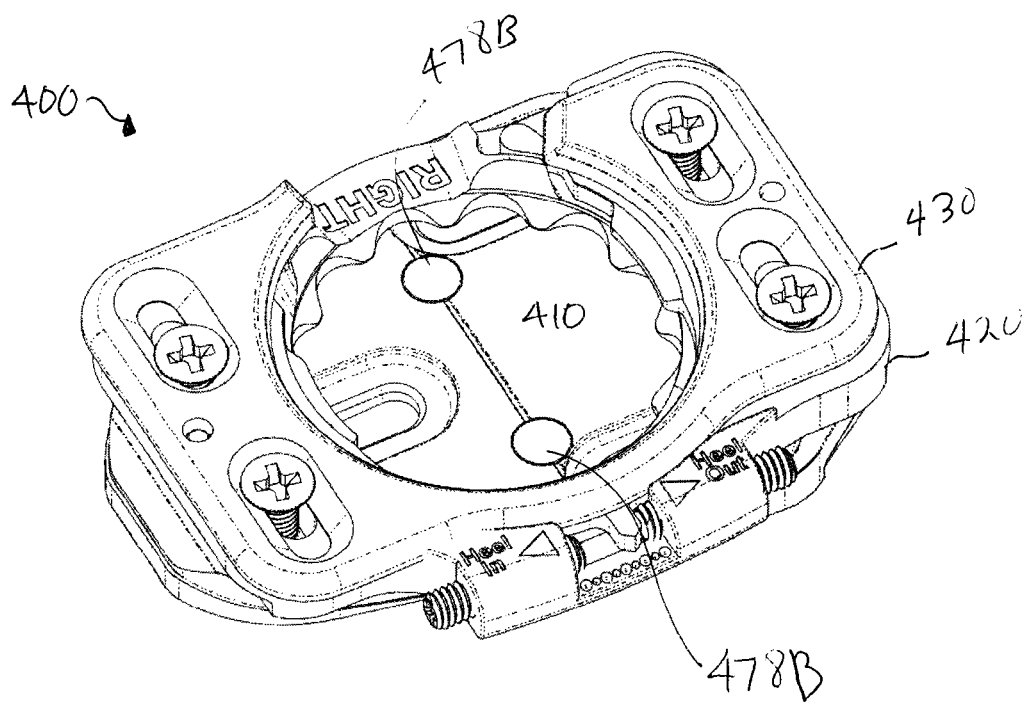
FIG. 15D is a perspective view of the cleat assembly of FIG. 15A with the pedal contact elements secured thereon.
Figure 16A:
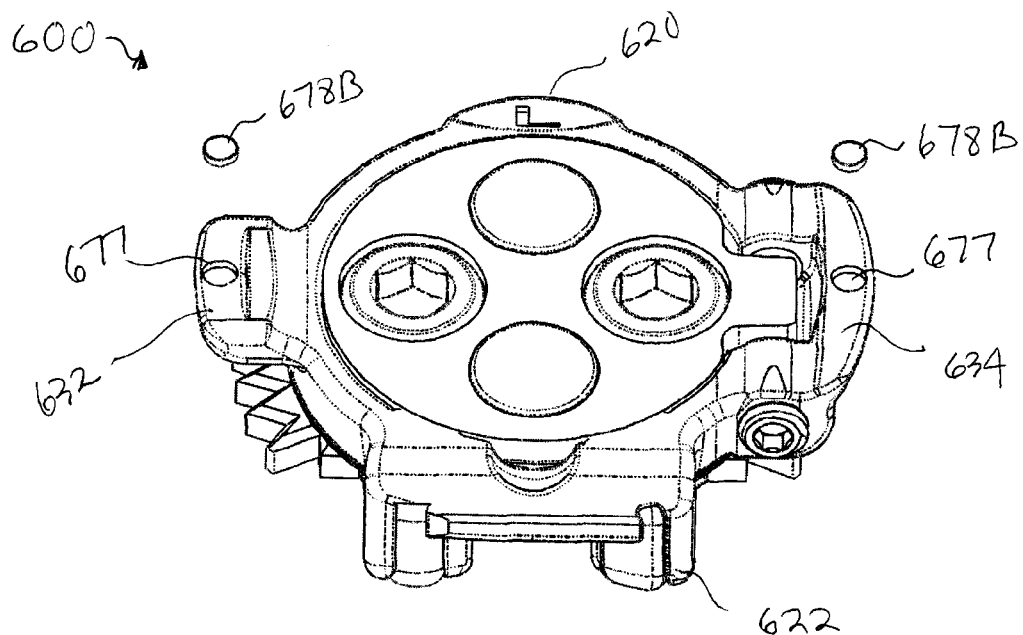
FIG. 16A is an exploded perspective view of an embodiment of a pedal assembly and the cleat contact elements.
Figure 16B:
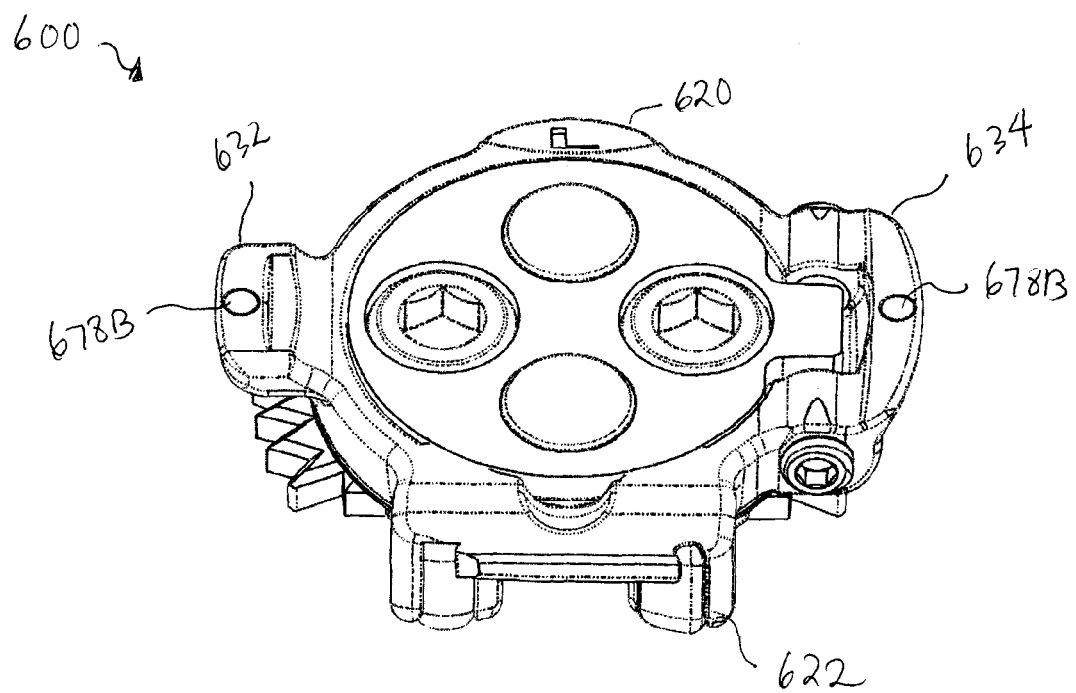
FIG. 16B is a perspective view of the pedal assembly of FIG. 16A with the cleat contact elements secured thereon.
Figure 16C:
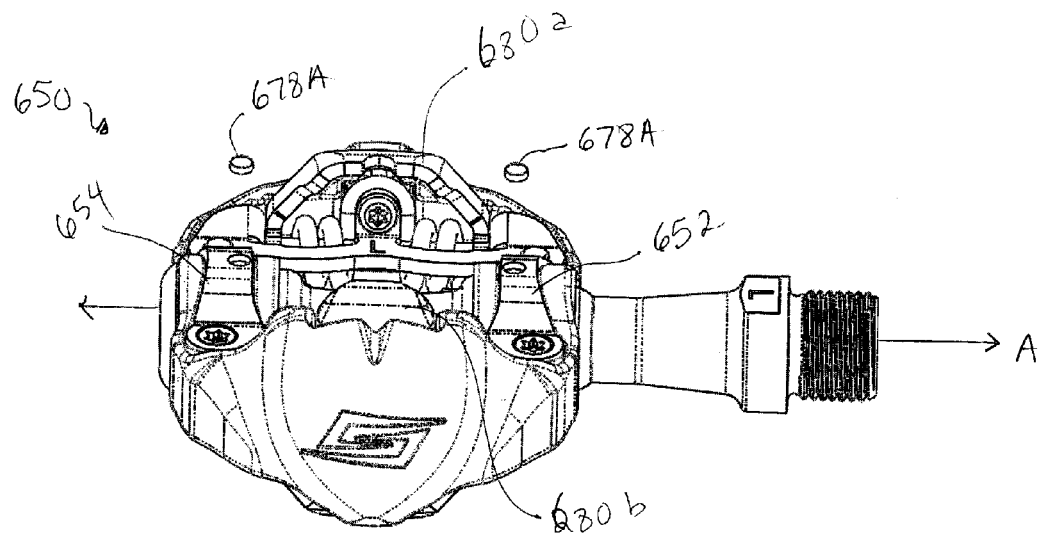
FIG. 16C is an exploded perspective view of an embodiment of a cleat assembly and the pedal contact elements, the cleat assembly corresponding to the pedal assembly of FIGS. 16A-16B.
Figure 16D:
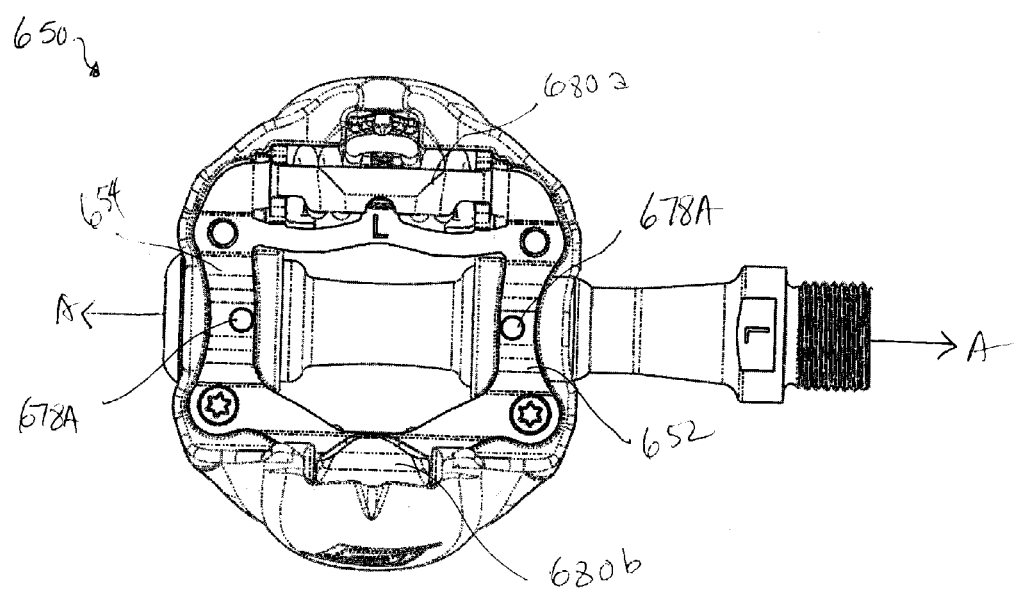
FIG. 16D is a perspective view of the cleat assembly of FIG. 16A with the pedal contact elements secured thereon.

FIGS. 14A-14C illustrate an embodiment of the cylindrical elements 521b for the cleat assembly 500. The cylindrical elements comprises a center portion 592, a top rounded edge 594 and a bottom rounded edge 596. When received in the shaped recess 525b (FIG. 12B), the top rounded edge 594 engages the lateral surface 282 of the rearward cleat retainer 280b.

FIGS. 15A-15D depict one embodiment of the pedal and cleat assemblies in which the pedal assembly 450 comprises a pedal body 472 having the cleat contact elements 478 disposed along a spindle axis A-A. The area 474 on the pedal body corresponding to the spindle axis A-A typically experiences the greatest amount of force applied by a cleat 400 when the cleat 400 is coupled to the pedal body 470. This force is typically the greatest when a down stroke is applied to the pedal body 472. Therefore the cleat contact elements 478A and corresponding pedal contact elements 478B is provided to reduce the wear experienced by the contacting pedal and cleat surfaces. In a preferred embodiment, the cleat contact elements 478A are coupled within recesses 476 disposed on a surface of the pedal body 472 along the spindle axis A-A and the pedal contact elements 478B are coupled within recesses 412 of the base plate 410 of the cleat assembly 400. When the cleat assembly 400 is coupled to the pedal assembly 450, the cleat contact elements 478A and the pedal contact elements 478B are in direct contact with one another and protect the remaining surfaces of the pedal assembly 450 and cleat assembly 400 from wear.

FIGS. 16A-16D depict another embodiment of the pedal and cleat assemblies in which the pedal assembly 650 (FIGS. 16C-16D) comprises a forward cleat retainer 680a and a rearward cleat retainer 680b to provide coupling engagement with a forward cleat projection 620 and a rearward cleat rejection 622 (FIGS. 16A-16B), respectively. The cleat assembly 600 further comprises inward and outward lateral projections 632, 634 formed in the cleat assembly 600 to rest atop inward and outward support pads 652, 654, respectively. The support pads 652, 654 are disposed along a spindle axis A-A. The lateral projections 632, 634 comprise recesses 677 which accommodate pedal contact elements 678B. Similarly, the inward and outward support pads 652, 654 similarly comprise recesses to accommodate cleat contact elements 678A. Thus, when the cleat assembly 600 is in coupling engagement with the pedal assembly 650, the cleat contact elements 678A are in direct facing and physical contact with the pedal contact elements 678B.

In particularly preferred embodiments, one or both of the cleat and pedal contact elements are made of a material that has a measure of hardness that is greater than hardened steel.

Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction.

Thus, in a preferred embodiment, the material has a Mohs hardness of greater than 7.0 and is made of a non-metal or a carbide, preferably selected from the group consisting of silicon carbide, boron carbide, tungsten carbide and titanium carbide.

The general principle here is that at least one (if not both) of the two pedal and cleat contact surfaces, which represent the contact point between the pedal and cleat assemblies, is/are made of a material that has a measure of hardness that is greater than hardened steel (e.g., a Mohs hardness of greater than 7.0), preferably a non-metal or a carbide, preferably selected from the group consisting of silicon carbide, boron carbide, tungsten carbide and titanium carbide.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

The following patent publications are incorporated herein by reference in their entireties: U.S. Pat. No. 7,877,904, issued Feb. 1, 2011, U.S. Pat. No. 7,472,498, issued Jan. 6, 2009, U.S. Pat. No. 6,494,117, issued Dec. 17, 2002, U.S. Pub. No. 2012/0103131, published May 3, 2012.

What is claimed is:

1. A cleat assembly comprising:
a cleat body having at least one coupling area; and
at least one element configured to be maintained within or disposed on the at least one coupling area;
wherein the at least one coupling area is positioned at a forward or rearward end of the cleat body so that the at least one element can act as a cam surface against a portion of a bicycle pedal; and
wherein the at least one element is configured to rotate through 360 degrees.

2. The cleat assembly of claim 1, wherein the at least one coupling area has at least one recess formed thereon and wherein the at least one element is shaped to be received in the at least one recess.

3. The cleat assembly of claim 1, wherein the at least one element has a generally cylindrical shape.

4. The cleat assembly of claim 3, wherein the generally cylindrical shape has a rounded top edge.

5. The cleat assembly of claim 1, wherein the at least one element is made of a non-metallic material having a measure of hardness that is greater than hardened steel.

6. The cleat assembly of claim 5, wherein the non-metallic material comprises carbide.

7. The cleat assembly of claim 6, wherein the carbide is selected from the group consisting of silicon carbide, boron carbide, tungsten carbide, and titanium carbide.

8. The cleat assembly of claim 1, wherein the at least one element has a generally circular shape.

9. A pedal and cleat assembly comprising:
a pedal assembly comprising
a pedal body having a first end and a second end,
a first retainer mounted proximate the first end of the pedal body, and
a second retainer mounted proximate the second end of the pedal body; and
a cleat assembly configured to be releaseably coupled to the pedal assembly, the cleat assembly comprising
a cleat body having at least one coupling area, and
at least one element shaped to be maintained within or disposed on the at least one coupling area;
wherein the at least one coupling area is positioned at a forward or rearward end of the cleat body so that the at least one element can act as a cam surface against the first or second retainer; and wherein the at least one element is configured to rotate through 360 degrees.

10. The pedal and cleat assembly of claim 9, wherein the at least one coupling area is at least one recess formed on the cleat body.

11. The pedal and cleat assembly of claim 9, wherein the at least one element has a generally cylindrical shape.

12. The pedal and cleat assembly of claim 11, wherein the generally cylindrical shape has a rounded top edge.

13. The pedal and cleat assembly of claim 12, wherein the rounded top edge is the cam surface.

14. The pedal and cleat assembly of claim 9, wherein the rotation of the at least one element reduces friction between the cleat assembly and the pedal assembly as the cleat assembly is released from the pedal assembly.

15. The pedal and cleat assembly of claim 9, wherein the rotation of the at least one element facilitates pivoting the cleat body with respect to the pedal body as the cleat assembly is released from the pedal assembly.

16. The pedal and cleat assembly of claim 9, wherein the at least one element is made of a non-metallic material having a measure of hardness that is greater than hardened steel.

17. The pedal and cleat assembly of claim 16, wherein the non-metallic material comprises carbide.

18. The pedal and cleat assembly of claim 17, wherein the carbide is selected from the group consisting of silicon carbide, boron carbide, tungsten carbide, and titanium carbide.

19. The cleat assembly of claim 9, wherein the at least one element has a generally circular shape.

20. A cleat assembly comprising:
a cleat body having at least one coupling area; and
at least one element configured to be maintained within or disposed on the at least one coupling area;
wherein the at least one coupling area is positioned at a forward or rearward end of the cleat body so that the at least one element can act as a cam surface against a portion of a bicycle pedal;
wherein the at least one element is configured to rotate through 360 degrees; and
wherein the at least one element has a generally cylindrical shape.

21. The cleat assembly of claim 20, wherein the generally cylindrical shape has a rounded top edge.

22. A pedal and cleat assembly comprising:
a pedal assembly comprising
a pedal body having a first end and a second end,
a first retainer mounted proximate the first end of the pedal body, and
a second retainer mounted proximate the second end of the pedal body; and
a cleat assembly configured to be releaseably coupled to the pedal assembly, the cleat assembly comprising
a cleat body having at least one coupling area, and
at least one element shaped to be maintained within or disposed on the at least one coupling area;
wherein the at least one coupling area is positioned at a forward or rearward end of the cleat body so that the at least one element can act as a cam surface against the first or second retainer;
wherein the at least one element is configured to rotate through 360 degrees; and
wherein the at least one element has a generally cylindrical shape.

23. The pedal and cleat assembly of claim 22, wherein the generally cylindrical shape has a rounded top edge.

24. The pedal and cleat assembly of claim 23, wherein the rounded top edge is the cam surface.

* * * * *